United States Patent
Stamps et al.

[11] Patent Number: 5,868,351
[45] Date of Patent: Feb. 9, 1999

[54] ROTOR BLADE STOWING SYSTEM

[75] Inventors: Frank B. Stamps, West Colleyville; Joe J. Zierer, Fort Worth; Cecil E. Covington, Hurst; Charles L. Baskin, Arlington; Glenn Shimek, Kennedale, all of Tex.

[73] Assignee: Bell Helicopter Textron Inc., Fort Worth, Tex.

[21] Appl. No.: 653,731

[22] Filed: May 23, 1996

[51] Int. Cl.[6] .......................... B64C 27/28; B64C 27/50
[52] U.S. Cl. ........................ 244/7 R; 244/6; 244/12.4; 244/56; 244/66; 416/143
[58] Field of Search .................. 244/6, 7 R, 7 C, 244/12.4, 48, 49, 56, 66; 416/142 R, 142 A, 142 B, 143, 153, 141 R, 141 A

[56] References Cited

U.S. PATENT DOCUMENTS

| | | |
|---|---|---|
| 2,369,276 | 2/1945 | Cameron et al. . |
| 2,385,464 | 9/1945 | Peterson . |
| 2,546,881 | 3/1951 | Avery . |
| 2,980,395 | 4/1961 | Rubbra et al. . |
| 3,097,701 | 7/1963 | Buivid . |
| 3,187,818 | 6/1965 | Barrett et al. . |
| 3,247,907 | 4/1966 | Mosinskis . |
| 3,321,019 | 5/1967 | Dmitroff et al. . |
| 3,389,878 | 6/1968 | Westrup . |
| 3,528,753 | 9/1970 | Dutton et al. . |
| 3,713,753 | 1/1973 | Brunsch . |
| 3,749,515 | 7/1973 | Covington et al. ............... 416/143 |
| 3,754,840 | 8/1973 | Zincone . |
| 3,782,856 | 1/1974 | Salkind et al. . |
| 3,813,186 | 5/1974 | Palachek et al. . |
| 3,829,240 | 8/1974 | Edenborough et al. . |
| 3,942,231 | 3/1976 | Whitaker . |
| 3,950,115 | 4/1976 | Euler . |
| 3,967,996 | 7/1976 | Kamov et al. . |
| 4,038,885 | 8/1977 | Jonda . |
| 4,083,656 | 4/1978 | Braswell et al. . |
| 4,247,255 | 1/1981 | De Rosa . |
| 4,255,087 | 3/1981 | Wackerle et al. . |
| 4,273,511 | 6/1981 | Mouille et al. . |
| 4,436,483 | 3/1984 | Watson . |
| 4,626,173 | 12/1986 | Mouille et al. . |
| 4,691,878 | 9/1987 | Vaughan et al. ....................... 244/7 R |
| 4,696,623 | 9/1987 | Bost . |
| 4,738,592 | 4/1988 | Cavanaugh .............................. 416/142 |
| 5,031,858 | 7/1991 | Schellhase et al. ...................... 244/7 R |
| 5,074,753 | 12/1991 | Covington et al. ...................... 416/141 |
| 5,085,315 | 2/1992 | Sambell ................................... 244/6 X |
| 5,337,974 | 8/1994 | Rumberger et al. ................ 244/7 R X |

FOREIGN PATENT DOCUMENTS

| | | |
|---|---|---|
| 621315 | 4/1949 | United Kingdom . |
| 909617 | 10/1962 | United Kingdom . |
| 1427158 | 3/1976 | United Kingdom . |

Primary Examiner—William Grant
Attorney, Agent, or Firm—Melvin A. Hunn

[57] ABSTRACT

Rotor blade stowing system for stowing rotor blades that conserves storage space without adding significant weight or cost to the aircraft. The system includes a rotary actuator disposed on a blade grip member. A rotor blade is pivotally connected to the blade grip member. The rotary actuator is operably coupled to a blade pivoting cam and a locking cam. The system includes a cam follower linkage which has a first end which includes a blade pivoting cam follower and a locking cam follower and a second end. The blade pivoting cam follower follows the blade pivoting cam. The locking cam follower follows the locking cam. The second end of the cam follower linkage is coupled to the blade grip member. The system includes a shaft rotatably coupled to the blade grip member, a locking linkage bell crank operably coupled to the shaft, a delay cam coupled to the blade grip member, and a locking linkage idler operably coupled to the locking linkage bell crank. The locking linkage idler includes a delay cam follower that follows the delay cam. The system includes a locking linkage which has a first end coupled to the locking cam and a second end coupled to the locking linkage idler.

39 Claims, 20 Drawing Sheets

ROTOR BLADE STOWING SYSTEM

NOTICE: This invention was made with Government support under N00019-83-C-0166 which was awarded by the Department of the Navy, Naval Air Systems Command. The Government has certain rights in this invention.

FIELD OF THE INVENTION

This invention generally relates to a rotor blade stowing system. In a specific aspect, this invention relates to a rotor blade stowing system for stowing rotor blades.

BACKGROUND OF THE INVENTION

The blades of rotary wing aircraft and tiltrotor aircraft are disposed in a deployed position during flight. While the aircraft is being stored, however, it is convenient to fold the blades into a stowed position so as to conserve storage space. Conserving storage space is economical and in some instances, such as on aircraft carriers, is an unavoidable requirement. Moreover, the problem of limited storage space has become more severe with the use of multi-rotor helicopters and with the advent of tiltrotor aircraft where the rotors are carried at the very tips of the wings. In addition, the blades of rotary wing and tiltrotor aircraft that are of variable pitch type must be prevented from varying the pitch angle while these variable pitch type rotor blades are being folded, stowed and deployed, so as to avoid damage to the aircraft from any resulting movement of the blades. Moreover, once a rotor blade is deployed, the blade must be prevented from inadvertently folding, such as may result from vibration caused during flight. To reduce drag on the aircraft during flight, it is desirable to provide fairings over components of the rotors. Thus, in order to fold the blades of faired rotors, it is also necessary to open a portion of the fairing in the direction in which the blade is folded. Manual folding of the blades into a stowed position has proven inadequate, especially with large rotary wing aircraft and more especially with tiltrotor aircraft where the blades are located very high and at the tips of the wings.

Accordingly, rotor blade stowing systems for stowing a variable pitch rotor blade were developed in an attempt to effectively meet the above requirements. However, these traditional rotor blade stowing systems have proven ineffective at conserving storage space without adding significant weight or cost to the aircraft. Moreover, these traditional rotor blade stowing systems have proven ineffective at opening a portion of the fairing of a faired rotor blade to allow for the blade to be folded without adding significant weight or cost to the aircraft.

Thus, there is a need in the art for an effective rotor blade stowing system for stowing a rotor blade that not only allows the blade to be folded, stowed, and deployed to conserve storage space but does so without adding significant weight or cost to the aircraft. Moreover, there is also a need in the art for an effective rotor blade stowing system that provides for the opening of a portion of the fairing of a faired rotor blade without adding significant weight or cost to the aircraft.

SUMMARY OF THE INVENTION

The present invention provides an effective rotor blade stowing system for stowing a rotor blade which allows the blade to be folded, stowed, and deployed to conserve storage space without adding significant weight or cost to the aircraft. The present invention also provides an effective rotor blade stowing system that provides for the opening of a portion of the fairing of a faired rotor blade to allow the faired blade to be folded, stowed, and deployed without adding significant weight or cost to the aircraft. The present invention has several advantages. It is of simplified construction, light weight, and has reduced maintenance requirements. An additional advantage of the present invention results from the low number of moveable parts which can utilize a low number of electronic sensors to provide any desired monitoring of the system.

A rotor blade stowing system in accordance with the present invention includes a rotary actuator disposed on a blade grip member. A rotor blade is pivotally connected to the blade grip member. The rotary actuator is operably coupled to a blade pivoting cam and a locking cam. The blade pivoting cam serves to allow the blade to be pivoted between deployed and folded positions. The locking cam serves to allow the blade to be locked and unlocked in a deployed position. The locking cam also serves to prevent or allow the pitch angle of the blade to be varied. The blade pivoting cam includes a shoulder portion and the locking cam includes a detent. The system includes a cam follower linkage which has a first end and a second end. The first end of the cam follower linkage includes a blade pivoting cam follower and a locking cam follower. The blade pivoting cam follower on the first end of the cam follower linkage follows the blade pivoting cam. The locking cam follower on the first end of the cam follower linkage follows the locking cam. The second end of the cam follower linkage is coupled to the blade grip member. The system includes a shaft rotatably coupled to the blade grip member, a locking linkage bell crank operably coupled to the shaft, and a delay cam coupled to the blade grip member. A locking linkage idler is operably coupled to the locking linkage bell crank. The locking linkage idler includes a delay cam follower that follows the delay cam. The system includes a locking linkage which has a first end and a second end. The first end of the locking linkage is coupled to the locking cam. The second end of the locking linkage is coupled to the locking linkage idler.

This invention also provides an effective method for folding a rotor blade from a deployed position to a folded position to conserve storage space which includes the steps of: actuating a rotary actuator; rotating a locking cam having a detent in response to the step of actuating the rotary actuator; altering the position of a locking linkage in response to the step of rotating the locking cam; rotating a shaft in response to the step of altering the position of the locking linkage; inserting a pitch angle locking pin into an opening in a drive hub of a rotor assembly so as to prevent any variation in the pitch angle of the blade in response to the step of rotating the shaft; retracting a blade locking pin to permit the blade to fold in response to the step of rotating the shaft; preventing alteration of the position of said locking linkage;; and, rotating a blade pivoting cam to pivot the blade from a deployed position into a folded position.

This invention also provides an effective method for deploying a rotor blade from a folded position to a deployed position which includes the steps of: actuating a rotary actuator; rotating a blade pivoting cam having a shoulder portion to pivot the blade from a folded position to a deployed position in response to the step of actuating the rotary actuator; abutting the blade against a first blade positioning member to prevent further pivoting of the blade; removing a locking cam follower of a cam follower linkage from a detent in a locking cam to allow the locking cam to rotate; rotating the locking cam; altering the position of a locking linkage in response to the step of rotating the locking cam; rotating a shaft which is rotatably coupled to a blade grip member in response to the step of altering the position of the locking linkage; abutting a blade locking pin to the blade so as to secure the blade in a deployed position in response to the step of rotating the shaft; and, retracting a pitch angle locking pin from an opening in a drive hub of a rotor assembly so as to allow for variation in the pitch angle of the blade in response to the step of rotating the shaft. This method can also include the step of simultaneously abutting a blade pivoting cam follower of the cam follower linkage against the shoulder portion of the blade pivoting cam to prevent any reverse rotation of the blade pivoting cam in response to the step of removing the locking cam follower of the cam follower linkage from the detent in the locking cam.

BRIEF DESCRIPTION OF THE DRAWINGS

FIG. 1A is an enlarged view of a portion of the prior-art system of FIG. 1.

DETAILED DESCRIPTION OF THE INVENTION

Figure 1:
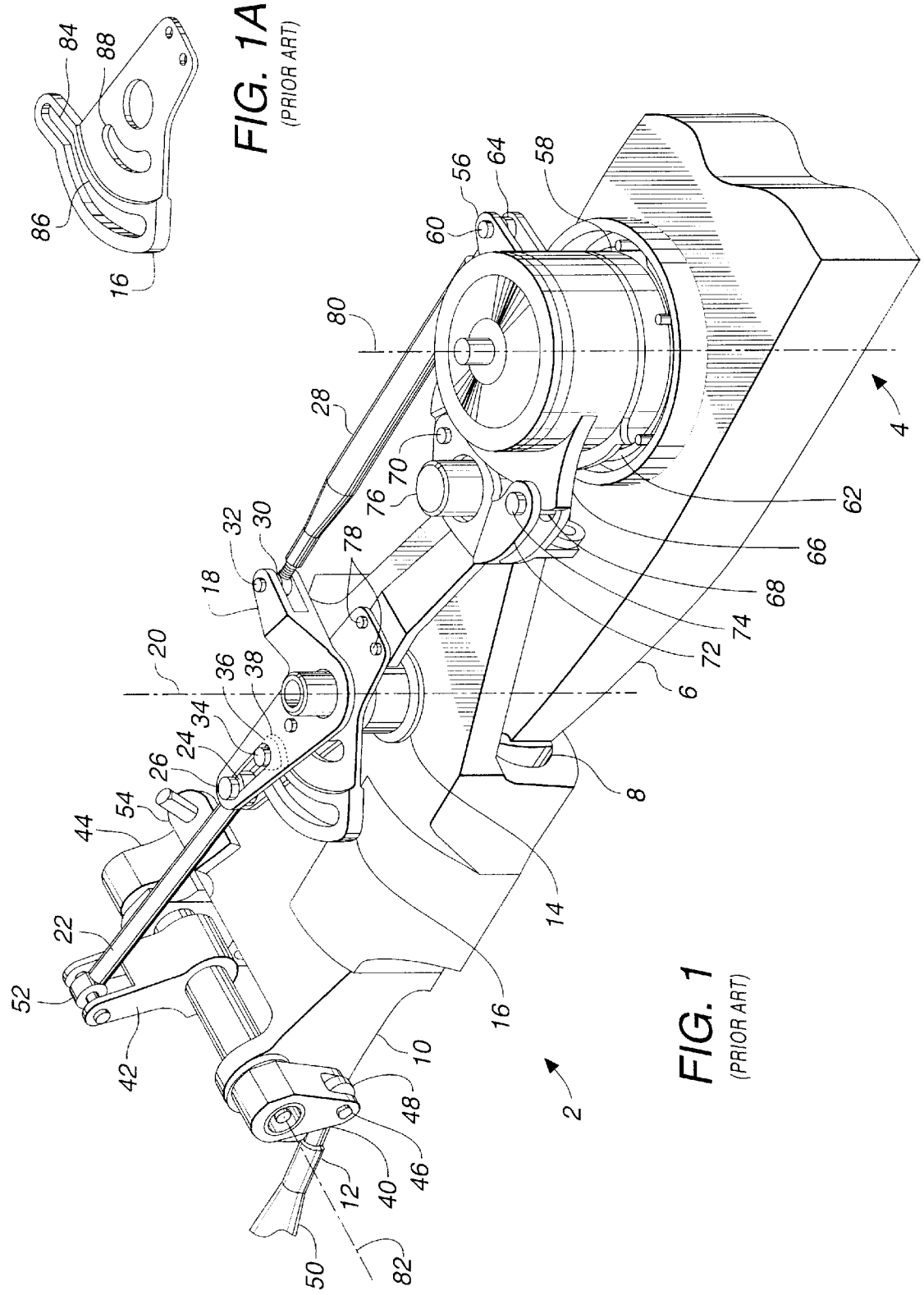
FIG. 1 is a partial side view of a prior-art power operated rotor blade stowing system.

Referring now to the figures, FIG. 1 depicts a prior art power operated rotor blade stowing system 2 that includes a rotor blade 4 having a blade tang 6. The end 8 of the blade tang 6 is disposed in a housing 10. Thus, FIG. 1 depicts the blade 4 in a deployed position. The housing 10 is secured to a blade grip member (not shown) which connects the blade 4 to a drive hub (not shown). The housing 10 includes a shaft 12 and a support element 14. The support element 14 supports a dwell cam 16 and a cam plate 18. The dwell cam 16 is fixed relative to the housing 10. The cam plate 18 can pivot about the longitudinal axis 20 of the support element 14.

The cam plate 18 has secured thereto a linkage 22. The linkage 22 includes a monoball bearing 24 through which a bolt 26 secures the linkage 22 to the cam plate 18. The cam plate 18 also has secured thereto the linkage 28 which includes the monoball bearing 30. A bolt 32 is disposed through the monoball bearing 30 to secure the linkage 28 to the cam plate 18.

A bolt 34 positions a cam follower 36 and a cam follower 38 such that the cam follower 36 follows the cam plate 18 and such that the cam follower 38 follows the dwell cam 16.

The shaft 12 includes a bell crank 40, a bell crank 42, and a bell crank 44. The bell crank 40 has a bolt 46 that extends through a monoball bearing 48 of a linkage 50. The linkage 50 is connected to a pitch locking pin (not shown) that serves to fix the pitch angle of the blade 4 while the blade 4 is being folded, stored and deployed.

The bell crank 44 is secured to a blade locking pin (not shown) through an idler (not shown), the position of which is determined by an over center mechanism 54. The blade locking pin serves to secure the blade 4 in a deployed position.

The linkage 28 is secured to a cam 56 on the outer housing of the rotary actuator. The rotary actuator includes a drive motor and a system of planetary gears. The system of planetary gears is operably connected to the outer housing of the rotary actuator which serves to operate the cam 56 and a cam 58. The cam 56 and the cam 58 move separately depending upon which is locked. A bolt 60 is disposed through a monoball bearing 64 to secure the linkage 28 to the cam 56.

A shoulder portion 66 of the cam 56 is followed by a cam follower 68. The cam follower 68 is secured to a plate 72 by a bolt 74. The bolt 70 secures a cam follower (not shown) to the plate 72 which follows a shoulder 62 of the cam 58. As shown in FIG. 1, the cam follower that follows the shoulder 62 is disposed against an edge (not shown) of the shoulder 62 such that the cam 58 is prevented from rotating in the clockwise direction about the axis 80. The tolerances of the cam followers secured to the plate 72 can be adjusted by the adjustment element 76 on the plate 72. The plate 72 is connected to the dwell cam 16 by a plurality of bolts 78.

To fold the blade 4, the rotary actuator first causes the cam 56 to rotate in the counterclockwise direction about the axis 80 such that the linkage 28 causes the cam plate 18 to rotate in the counterclockwise direction about the axis 20 of support element 14. As the cam plate 18 rotates, the cam followers 36 and 38 follow the cam plate 18 and the dwell cam 16, respectively, such that the linkage 22 is pulled toward the support element 14. As a result, the shaft 12 is rotated about the axis 82 such that the bell crank 40 causes the linkage 50 to insert a pitch locking pin into a drive hub. The rotation of the shaft 12 simultaneously causes the bell crank 44 to cause a blade locking pin to be removed from contact with the end 8 of the blade 4 so as to allow the blade 4 to be folded.

As a result of the rotation of the cam 56, the cam follower 68 has followed the shoulder 66 of the cam 56 such that the plate 72 no longer serves to prevent the cam 58 from rotating. Thus, the cam 58 can then rotate in the clockwise direction about the axis 80. As a result, the blade 4 begins to fold. The cam 58 can continue to rotate until the blade 4 is disposed in a stowed position. A position indicator with an electronic brake serves to prevent the cam 58 from further rotating when the cam 58 has reached a desired position.

FIG. 1A depicts in more detail the dwell cam 16. The dwell cam 16 includes an arcuate portion 84 and an arcuate portion 86. The arcuate portion 84 is included in a circle centered about the monoball bearing 52. The arcuate portion 84 allows for some movement of the cam plate 18 with respect to the dwell cam 16 such that the movement does not serve to alter the position of the linkage 22 with respect to the support element 14. Such movement may be the result of the centrifugal force resulting from rotation of the blade 4. The arcuate portion 86 is included in a circle centered about the longitudinal axis 20 of the support element 14. As the cam follower 38 follows the arcuate portion 86 of the dwell cam 16, the position of the linkage 22 is altered with respect to the support element 14. The dwell cam 16 also includes the opening 88 which can receive a bolt and a spacer to more securely dispose the cam plate 18 with respect to the dwell cam 16.

Figure 2:
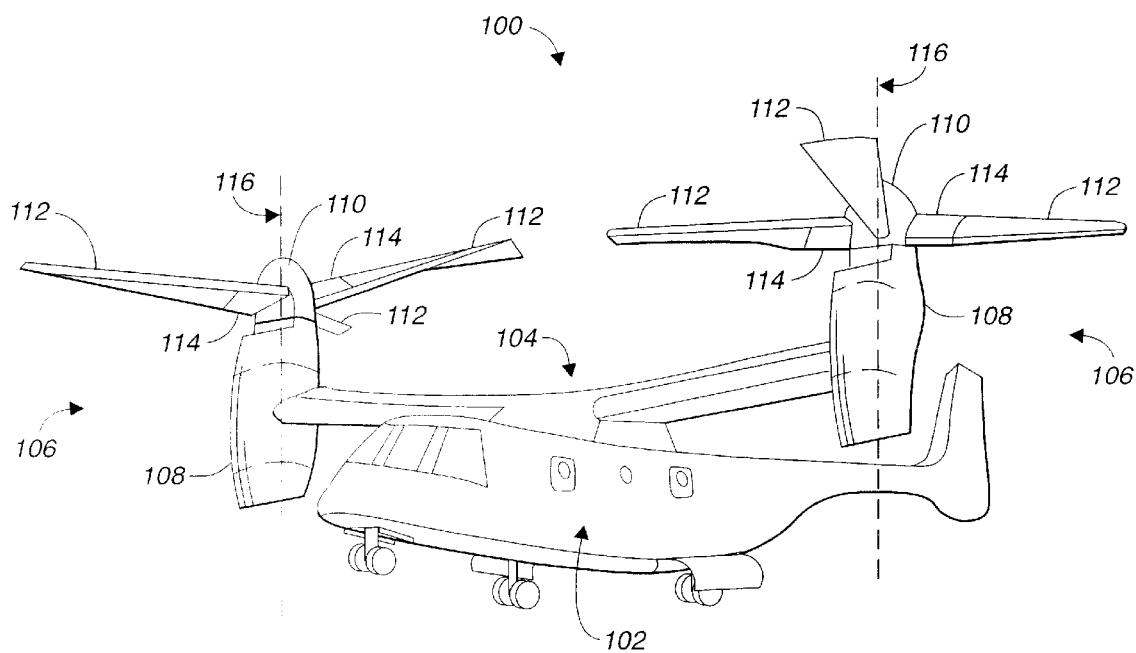
FIG. 2 is a pictorial view of a tiltrotor aircraft incorporating a power operated rotor blade stowing system in accordance with the present invention.

FIG. 2 depicts a tiltrotor aircraft 100 that includes a fuselage assembly 102 and a wing assembly 104. The longitudinal axis of the wing assembly 104 is disposed in about a perpendicular relation with respect to the longitudinal axis of the fuselage assembly 102. The wing assembly 104 includes two tiltrotors 106 that are disposed on opposite ends of the wing assembly 104. Each tiltrotor 106 includes a nacelle 108 and a drive hub fairing 110. Each nacelle 108 is pivotally connected to an end of the wing assembly 104 to allow the tiltrotors 106 to be pivoted with respect to the wing assembly 104 to provide for both horizontal and vertical flight of the aircraft 100. As shown in FIG. 2, each tiltrotor 106 secures three rotor blades 112 in a deployed position. A portion of each rotor blade 112 is covered by a blade grip member fairing 114. Each tiltrotor 106 can rotate the blades 112 about a longitudinal axis 116 of the tiltrotor 106 to provide lift to the aircraft 100.

Figure 3:
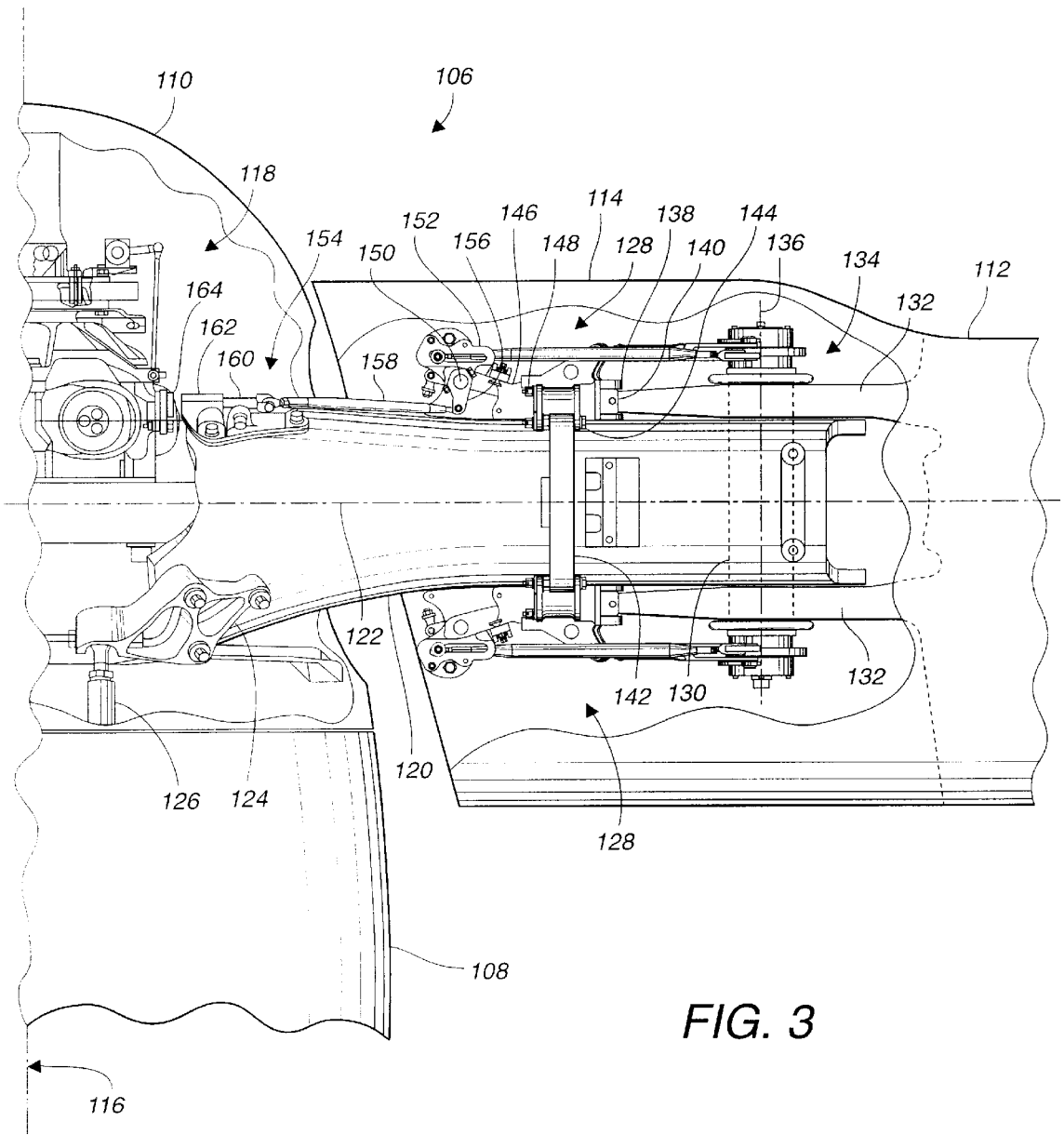
FIG. 3 is a partial view of the tiltrotor aircraft depicted in FIG. 2 which depicts a power operated rotor blade stowing system in accordance with the present invention.

FIG. 3 is a partial view of a tiltrotor 106 that depicts only that portion of the tiltrotor 106 that is disposed between the longitudinal axis 116 of the tiltrotor 106 and a single rotor blade 112, that is also only partially depicted. A portion of the drive hub fairing 110 is removed to depict a drive hub 118 which is otherwise covered by the drive hub fairing 110. The drive hub 118 is rotated about the longitudinal axis 116 of the tiltrotor 106 by an engine (not shown) that is disposed within the nacelle 108. Likewise, a portion of the blade grip member fairing 114 is removed to depict a blade grip member 120 which is otherwise covered by the blade grip member fairing 114. The blade grip member 120 connects the blade 112 to the drive hub 118 such that the blade 112 as well as the blade grip member 120 can be rotated about the longitudinal axis 116 of the tiltrotor 106 when the drive hub 118 is rotated about the longitudinal axis 116 of the tiltrotor 106.

The pitch angle of the rotor blade 112 can be varied throughout each complete rotation of the rotor blade 112 about the longitudinal axis 116 of the tiltrotor 106. In order to permit variation in the pitch angle of the blade 112, the blade grip member 120 rotates about its longitudinal axis 122. The longitudinal axis 122 of the blade grip member 120 is generally perpendicular to the longitudinal axis 116 of the tiltrotor 106. In order to permit for the rotation of the blade grip member 120 about the longitudinal axis 122, a lever arm 124 is mounted on the blade grip member 120. The lever arm 124 is coupled to a control link 126 that is actuated to cause the rotor blade 112 to rotate about the longitudinal axis 122 of the blade grip member 120, thereby varying the pitch angle of the rotor blade 112.

The rotor blade stowing system of the present invention, which is generally denoted as 128, allows the blade 112 to be pivoted between deployed and stowed positions. As the rotor blade 112 is pivoted between deployed and stowed positions, the rotor blade 112 pivots with respect to the blade grip member 120 about a blade pivot pin 130. Thus, the blade 112 is pivotally coupled to the blade grip member 120. Preferably, each rotor assembly 106 includes at least one rotor blade stowing system 128 on all but one blade 112 which can be indexed over the wing assembly 104. This blade 112 may be referred to as the "dead blade" 131 in that it does not possess a rotor blade stowing system 128 and therefore is not pivoted between deployed and folded positions. The remaining blades 112 that include a rotor blade stowing system 128 can then be folded to lie beside the indexed dead blade 131. This process is pictorially illustrated in FIGS. 4A–4E.

Figure 4A:
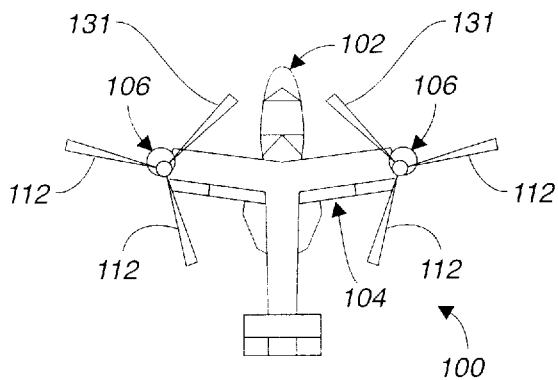
FIGS. 4A–4E pictorially illustrate a method in accordance with the present invention for stowing the blades of a tiltrotor aircraft.
Figure 4B:
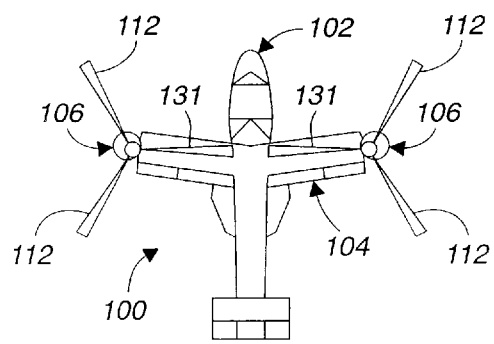
Figure 4C:
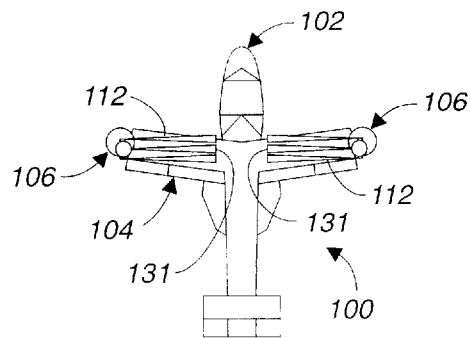
Figure 4D:
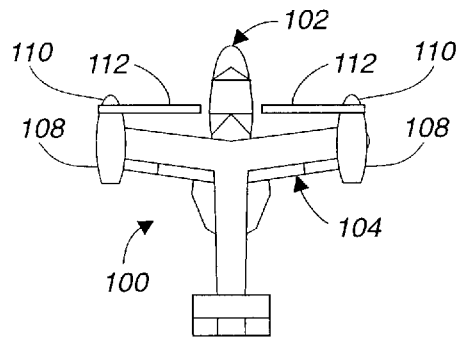
Figure 4E:
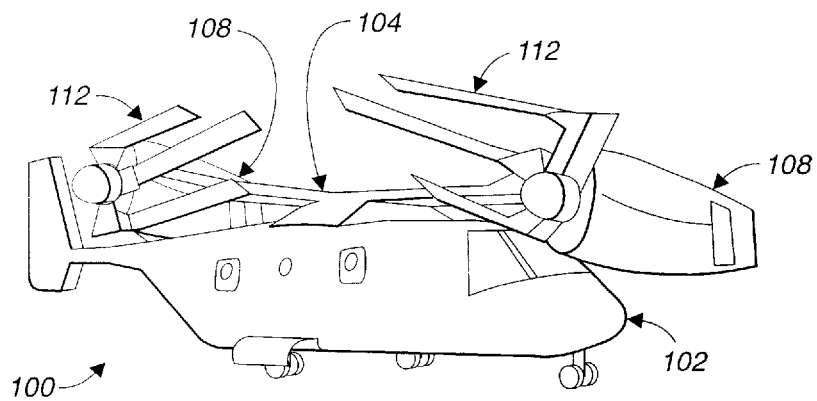

FIGS. 4A–4E pictorially illustrate a method of folding the rotor blades 112 of the tiltrotor aircraft 100 utilizing the rotor blade stowing system 128. As shown in FIG. 4A, the aircraft 100 has come to a stop on the ground, with the rotor blades 112 deployed in random fashion. In FIG. 4B, the blades 112 have been rotated so that the dead blade 131 on each tiltrotor 106 is generally aligned with the longitudinal axis of the wing assembly 104. In FIG. 4C, it is shown that the remaining two blades 112 of each tiltrotor 106 have been pivoted about respective blade pivot pins 130, as shown in FIG. 3, using a rotor blade stowing system 128. The blades 112 have been folded so that they lie in juxtaposition alongside of the dead blades 131, which were initially aligned with the longitudinal axis of the wing assembly 104. If it is a disadvantage to have the tiltrotor 106 in the vertical position as illustrated in FIGS. 4A, 4B and 4C, the tiltrotors 106 can be tilted to a position wherein the blades 112 lie along and generally parallel to the end of the wing assembly 104 as shown in FIG. 4D. Moreover, to further conserve storage space, the wing assembly 104 can be pivoted such that the longitudinal axis of the wing assembly 104 is parallel to the longitudinal axis of the fuselage assembly 102, as shown in FIG. 4E.

Referring back to FIG. 3, the particular foldable rotor blade 112 that is depicted includes two blade tangs 132. Each blade tang 132 includes an opening through which extends the blade pivot pin 130. Although the blade 112 is depicted as having two blade tangs 132, the rotor blade stowing system 128 can also be used on blades having only one blade tang 132. However, where the rotor blades 112 are sufficiently large enough to provide two blade tangs 132, it may be preferable to provide two rotor blade stowing systems 128 on each rotor blade 112, as depicted in FIG. 3. Since FIG. 3 depicts two rotor blade stowing systems 128, the following description refers primarily to a single rotor blade stowing system 128 for purposes of simplification and clarity. Specifically, as shown in FIG. 3, the following description refers primarily to the upper rotor blade stowing system 128.

The blade pivot pin 130 encloses a rotary actuator (not shown). The rotary actuator includes a drive motor and a system of planetary gears. The system of planetary gears is coupled to an outer housing 134 of the blade pivot pin 130. As will be more fully described herein, the rotor blade stowing system 128 serves to pivot the blade 112 about the longitudinal axis 136 of the blade pivot pin 130 between deployed and folded positions. The longitudinal axis 136 of the blade pivot pin 130 is generally perpendicular to the longitudinal axis 122 of the blade grip member 120.

As shown in FIG. 3, the end of the uppermost blade tang 132 is disposed within a latch support housing 138 which forms a portion of the rotor blade stowing system 128. A first blade positioning member 140, which can form a portion of the latch support housing 138, is engageable with the blade 112 to position the blade 112 at a desired deployment. The latch support housing 138 is secured to the blade grip member 120 by a securing element 142. The securing element 142 is secured to the latch support housing 138 by a bolt 144. Where, as shown in FIG. 3, the blade 112 includes two rotor blade stowing systems 128, each rotor blade stowing system 128 can be secured to the blade grip member 120 by extending the securing element 142 therebetween. An additional securing element 142, which is not depicted in FIG. 3, is disposed on an opposing side of the blade grip member 120.

A shaft support housing 146 can be coupled to the latch support housing 138 by a plurality of bolts 148. Alternatively, the shaft support housing 146 and the latch support housing 138 can be a unitary element. Preferably, however, the shaft support housing 146 and the latch support housing 138 are separate elements; in which case, the shaft support housing 146 preferably is made of aluminum and the latch support housing 138 preferably is made of titanium.

The shaft support housing 146 includes a shaft 150 and a delay cam 152. Actuation of the shaft 150 actuates a pitch angle locking assembly generally denoted as 154 and a blade locking assembly that will be more fully discussed in regards to FIG. 5. The pitch angle locking assembly 154 serves to prevent any variation in the pitch angle of the blade 112 while the blade 112 is being pivoted between stowed and deployed positions and while the blade 112 is being stowed. The pitch angle locking assembly 154 includes a pitch angle locking bell crank 156 that is operably coupled to the shaft 150. The pitch angle locking bell crank 156 is coupled to a pitch angle locking linkage 158 that is coupled to a pitch angle locking pin 160. The pitch angle locking pin 160 is slidably mounted in a bracket 162 that is affixed to the blade grip member 120. The pitch angle locking pin 160 is retractably insertable into an opening 164 in the drive hub 118. While the pitch angle locking pin 160 is inserted into the opening 164, the blade grip member 120 is coupled to the drive hub 118 such that variation in the pitch angle of the blade 112 is prevented. Thus, locking the blade grip member 120 to the drive hub 118 prevents rotation of the blade grip member 120 and the attached rotor blade 112 about the longitudinal axis 122 of the blade grip member 120. As will be explained more fully hereinafter, actuation of the pitch angle locking bell crank 156 at the appropriate time causes the pitch angle locking linkage 158 to move the pitch angle locking pin 160 into or out of locking engagement with the drive hub 118.

Figure 5:
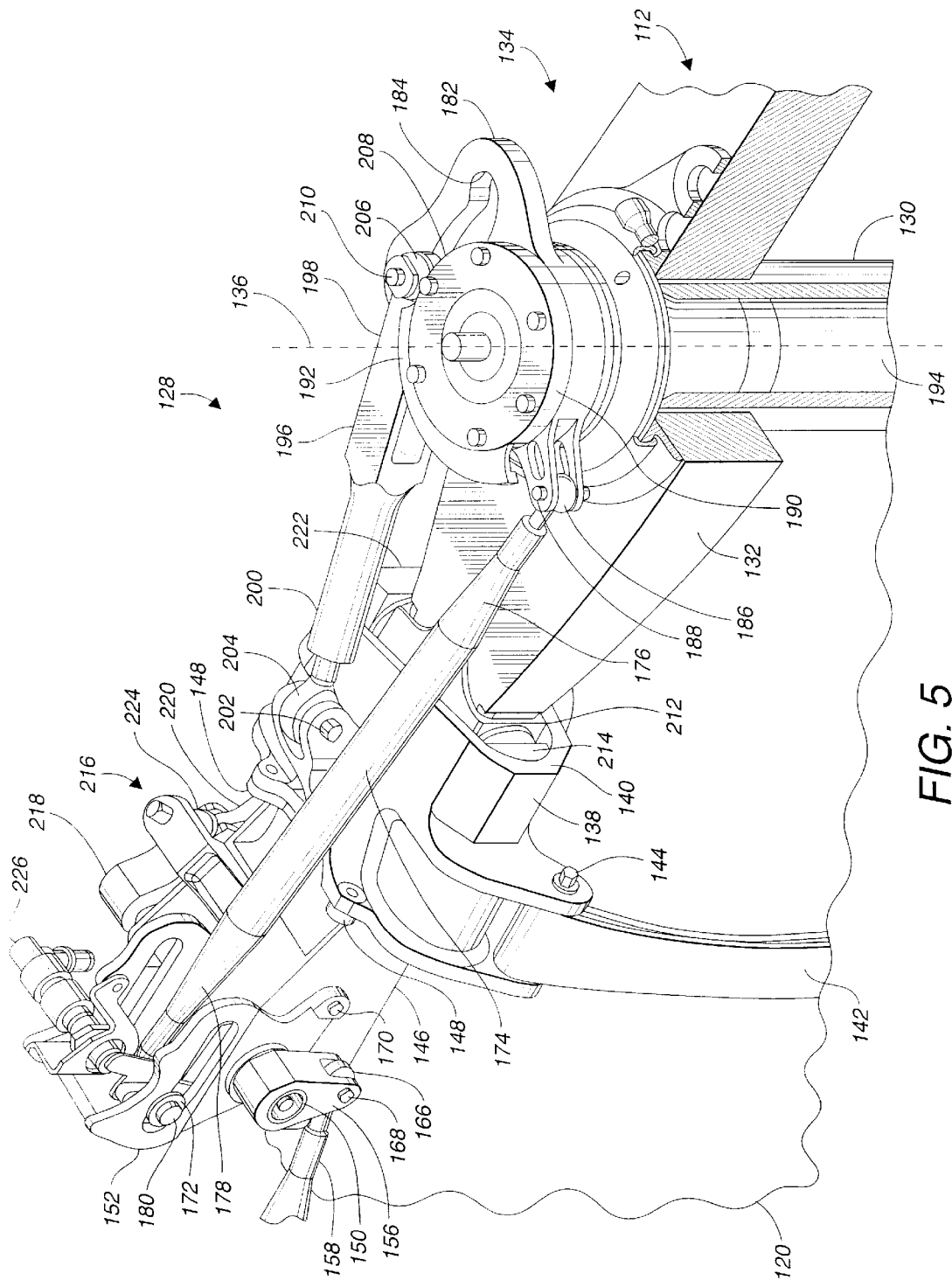
FIG. 5 is a partial side view of a power operated rotor blade stowing system in accordance with the present invention system.

FIG. 5, wherein the same reference characters are used for elements which are in common with FIG. 3, depicts a partial view of the rotor blade stowing system 128 which only partially depicts the pitch angle locking linkage 158, the blade grip member 120, and the blade 112. As previously mentioned, the pitch angle locking linkage 158 is coupled to the pitch angle locking bell crank 156 which is coupled to the shaft 150. The pitch angle locking linkage 158 can include a monoball bearing 166 that is coupled to the pitch angle locking bell crank 156 by a bolt 168.

The delay cam 152 is coupled to the shaft support housing 146 by a plurality of bolts 170. The delay cam 152 is followed by a delay cam follower 172 that is coupled to a locking linkage 174. Preferably, and as shown in FIG. 5, the delay cam 152 is a dwell cam. A dwell cam is a cam wherein an opening is disposed therethrough such that the movement of a cam follower disposed therein is restricted. The delay cam 152 includes an opening through which extends the delay cam follower 172. The relationship between the delay cam 152, the delay cam follower 172, the locking linkage 174 and the shaft 150 will be discussed more fully in relation to FIGS. 7 and 8.

The locking linkage 174 includes a first end 176 and a second end 178. The second end 178 of the locking linkage 174 is connected to the delay cam follower 172 by a bolt 180. The first end 176 of the locking linkage 174 is coupled to a locking cam 182 on the outer housing 134 of the blade pivot pin 130. The locking cam 182 includes a first detent 184. Preferably, and as shown in FIG. 5, the locking cam 182 is a dwell cam. A "detent" is a portion of a cam which serves to alter the trajectory of a cam follower as the cam follower follows the cam. The first end 176 of the locking linkage 174 can include a monoball bearing 186 that is coupled to the locking cam 182 by a bolt 188.

The outer housing 134 of the blade pivot pin 130 also includes a pivoting cam 190 that has a shoulder portion 192. Both the locking cam 182 and the pivoting cam 190 are disposed on the outer housing 134 of the blade pivot pin 130 and are operably coupled to a rotary actuator generally denoted as 194. As previously mentioned, the rotary actuator 194 is disposed within the blade pivot pin 130. More specifically, both the locking cam 182 and the pivoting cam 190 are operably coupled to the system of planetary gears that are driven by the drive motor of the rotary actuator 194. As a result, the locking cam 182 and the pivoting cam 190 move separately depending upon which one is locked.

The rotor blade stowing system 128 also includes a cam follower linkage 196. The cam follower linkage 196 includes a first end 198 and a second end 200. The second end 200 of the cam follower linkage 196 can be coupled to the latch support housing 138 by a bolt 202 that extends through a monoball bearing 204. The first end 198 of the cam follower linkage 196 positions a pivoting cam follower 206 and a locking cam follower 208 with respect to the outer housing 134 of the blade pivot pin 130. The pivoting cam follower 206 follows the pivoting cam 190 and the locking cam follower 208 follows the locking cam 182. The pivoting cam follower 206 and the locking cam follower 208 are secured to the first end 198 of the cam follower linkage 196 by a bolt 210.

The blade tang 132 includes a blade tang fitting 212 that abuts a first blade contact member 214 when the blade 112 is in a deployed position. The first blade contact member 214 provides a replaceable cushion to abut the blade 112. The first blade contact member 214 can be coupled to the first blade positioning member 140 of the latch support housing 138. The first blade contact member 214 is preferably made of a self-lubricating material such as polytetrafluorethylene ("PTFE") (known by the trademark TEFLON of E.I. de Pont de Nemours, Inc.).

As previously mentioned, actuation of the shaft 150 also actuates a blade locking assembly generally denoted as 216 that serves to releasably lock the blade 112 in a deployed position. The blade locking assembly 216 includes a blade locking bell crank 218 that is operably coupled to the shaft 150. The blade locking bell crank 218 is coupled to a blade locking assembly idler 220 which is coupled to a blade locking pin 222. The blade locking pin 222 serves to maintain the blade 112 in a deployed position. When the blade locking pin 222 engages the blade 112, the blade locking pin 222, along with the first blade positioning member 140, prevent the blade 112 from rotating about the longitudinal axis 136 of the blade pivot pin 130. An over center mechanism 224 is coupled to the shaft support housing 146 so that the blade locking pin 222 cannot be inadvertently dislodged nor can the force of the blade 112 exerted thereon push the blade locking pin 222 out of the locked position. Preferably, the blade locking pin 222 is made of PTFE. Moreover, an electronic sensor 226 can be coupled to the delay cam 152 to monitor the position of the cam follower 172 with respect to the delay cam 152.

Figure 6:
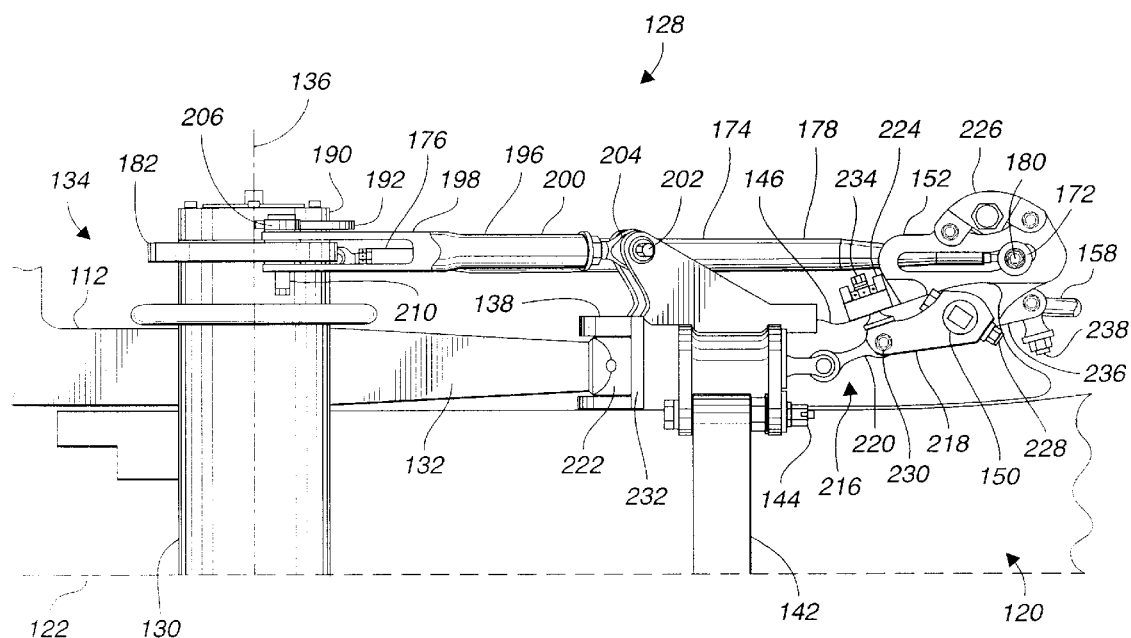
FIG. 6 is a partial side view of an opposing side of the power operated rotor blade stowing system depicted in FIG. 4.

FIG. 6, wherein the same reference characters are used for elements which are in common with FIG. 5, partially depicts an opposing view the rotor blade stowing system 128 depicted in FIG. 5. For the sake of clarity, FIG. 6 depicts only a portion of the blade 112 and only that portion of the blade grip member 120 which extends above the longitudinal axis 122 of the blade grip member 120. The blade locking bell crank 218 can be coupled to the shaft 150 by the bolt 228. The blade locking bell crank 218 is coupled to the blade locking assembly idler 220 by the bolt 230. The blade locking assembly idler 220 is coupled to the blade locking pin 222. The blade locking pin 222 is slidably mounted in a bracket 232 that forms a portion of the latch support housing 138. An adjustable element 234 is provided so that the over center mechanism 224 can be adjusted as desired. FIG. 6 also depicts a locking linkage bell crank 236 that is also coupled to the shaft 150. An adjustment element 238 is connected to the locking linkage bell crank 236.

Figure 7:
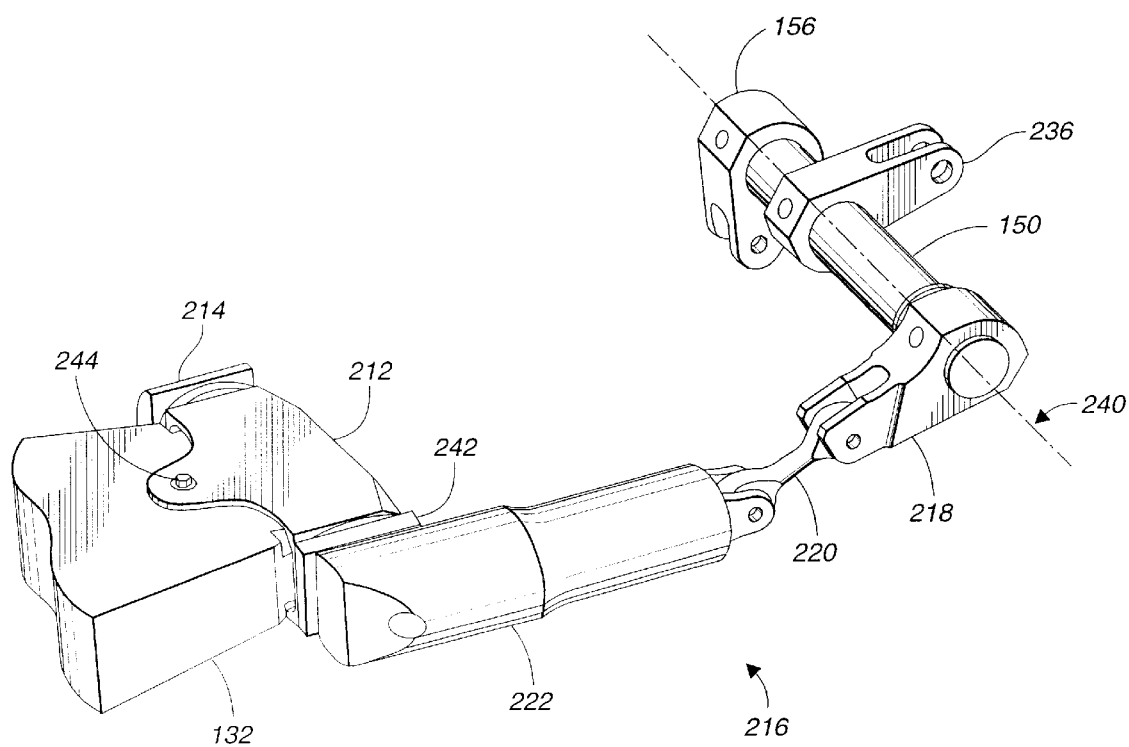
FIG. 7 is a partial view of a blade locking system in accordance with the present invention.

FIG. 7 depicts the shaft 150 having coupled thereto the pitch angle locking bell crank 156, the locking linkage bell crank 236 and the blade locking bell crank 218. The shaft 150 can rotate about its longitudinal axis 240. As previously indicated, the blade locking bell crank 218 is coupled to the blade locking assembly idler 220 which is coupled to the blade locking pin 222. Thus, FIG. 7 partially depicts the blade locking assembly 216. Moreover, as shown in FIG. 7, the blade locking pin 222 is in contact with the partially depicted blade tang 132. Preferably, the blade locking pin 222 is made of PTFE. Alternatively, the blade locking pin 222 can include a second blade contact member 242 disposed between the blade locking pin 222 and the fitting 212 of the blade tang 132. Preferably, the second blade contact member 242 is made of PTFE. The fitting 212 can be coupled to the blade tang 132 by a bolt 244. Thus, the fitting 212 of the blade tang 132 can be securely disposed between the first blade contact member 214 and the second blade contact member 242 when the blade 112 is in a deployed position.

Figure 8:
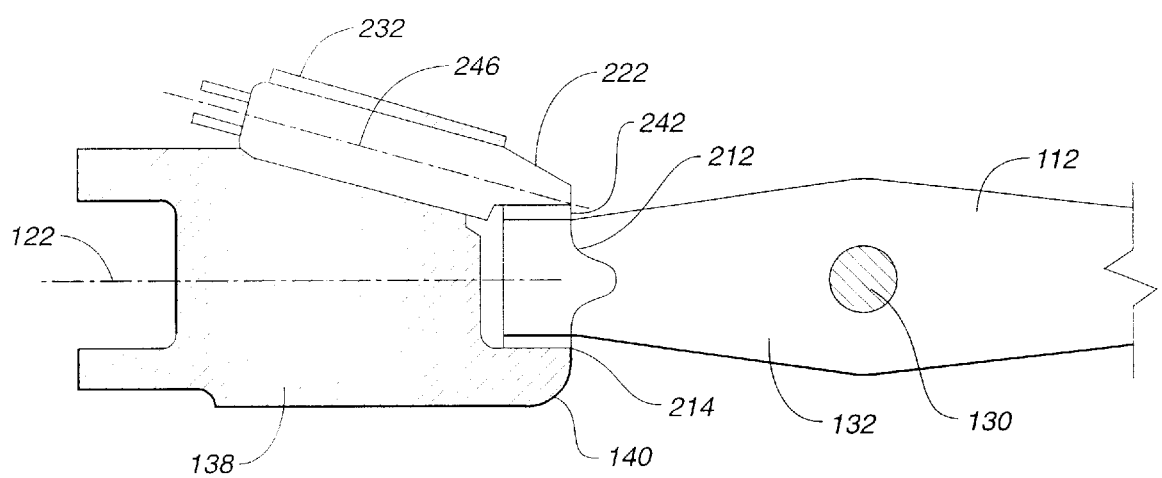
FIG. 8 is a partial view of a rotor blade being locked in a deployed position by a blade locking system in accordance with the present invention.

FIG. 8 depicts the relative positions of the blade locking pin 222 and the partially depicted blade 112. As shown in FIG. 8, the blade locking pin 222 is disposed within the bracket 232 which forms a portion of the latch support housing 138. When the blade locking pin 222 engages the blade tang 132, the longitudinal axis 246 of the blade locking pin 222 is disposed in an angular relation with respect to the longitudinal axis 122 of the blade grip member 120, which is not depicted in FIG. 8 for the sake of clarity. As a result, a camming action occurs such that the blade tang 132 is securely retained against the first blade positioning member 140. Preferably, the blade tang 132 is securely retained against the first blade positioning member 140 such that the fitting 212 is positioned between and in contact with the first blade contact member 214 and the second blade contact member 242. Accordingly, and so long as the blade locking pin 222 is engaged as shown, the blade 112 is locked in a deployed position such that it can not pivot about the blade pivot pin 130.

Figure 9:
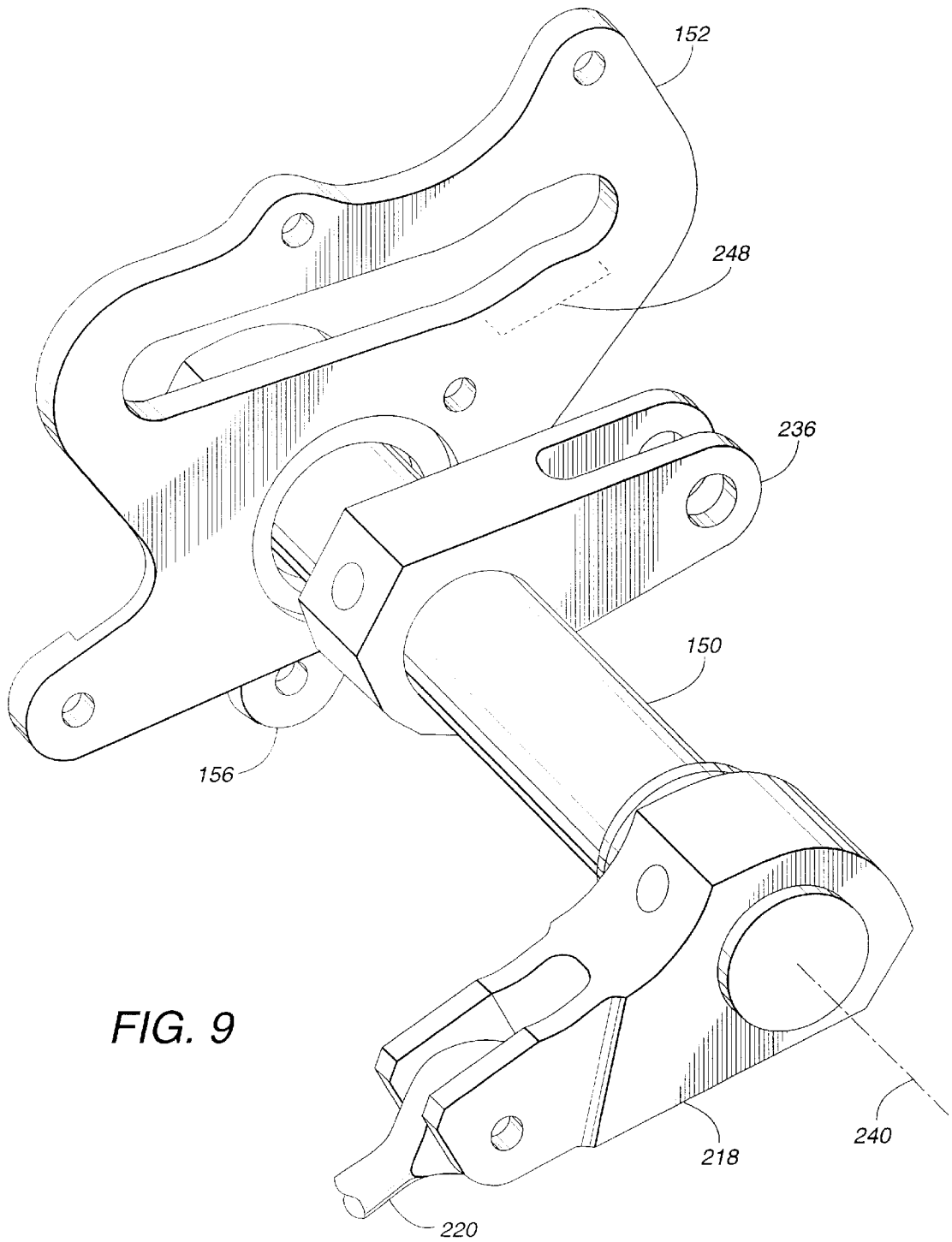
FIG. 9 is a view of a rotatable shaft which forms a portion of a power operated rotor blade stowing system in accordance with the present invention.
Figure 10:
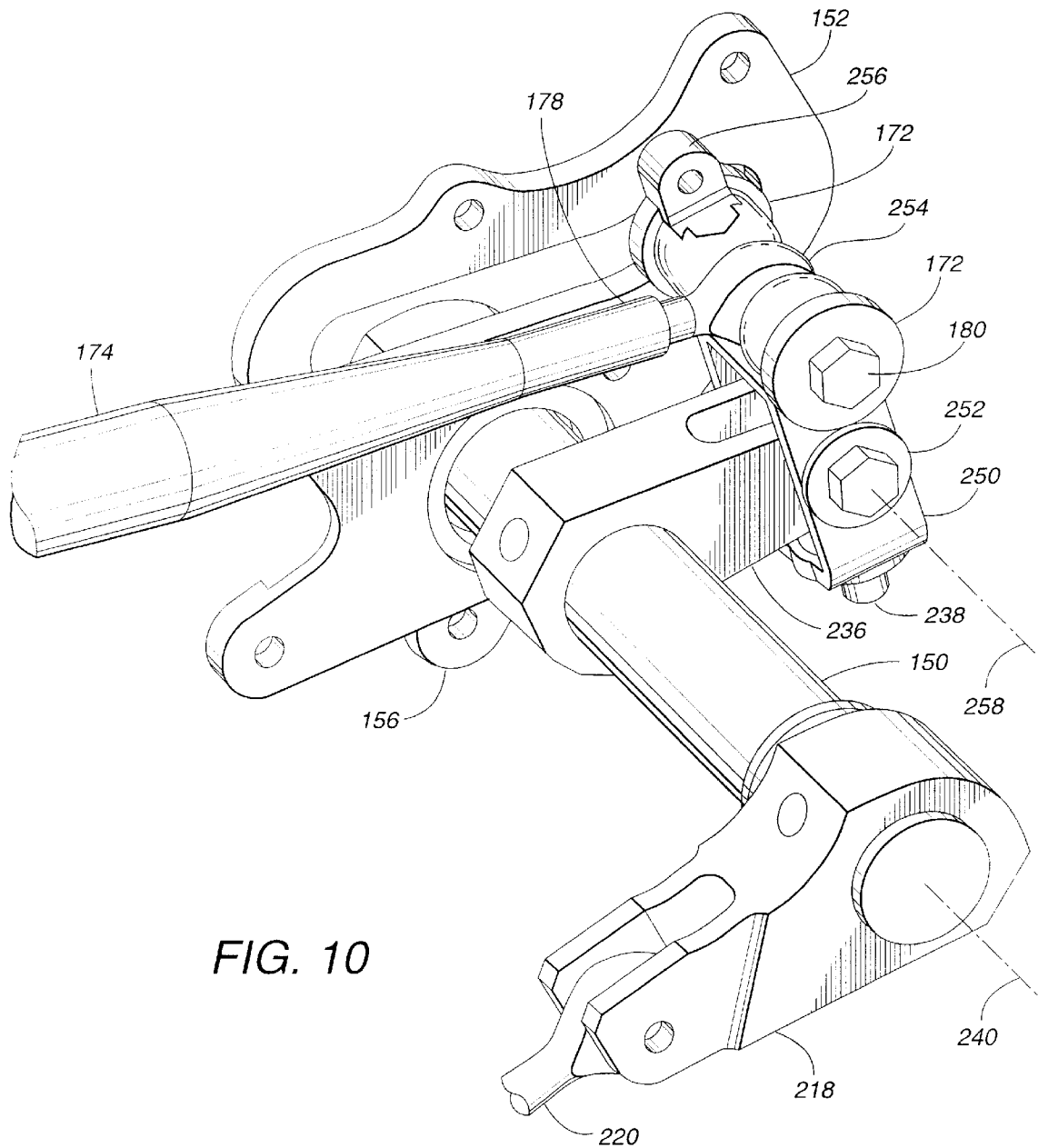
FIG. 10 is an additional view of the rotatable shaft depicted in FIG. 9 which further depicts the relation of the rotatable shaft to a power operated rotor blade stowing system in accordance with the present invention.

FIG. 9 depicts the shaft 150 extending through the delay cam 152. The delay cam 152 includes an arcuate portion 248. FIG. 10 further depicts a locking linkage idler 250 that is coupled to the locking linkage bell crank 236 by a bolt 252. The locking linkage idler 250 supports the delay cam followers 172. Although only one delay cam 152 is depicted in FIGS. 9 and 10, it is preferred that an additional delay cam 152 be disposed around the shaft 150 so that each delay cam follower 172 follows a respective delay cam 152. The delay cam followers 172 are coupled to the locking linkage idler 250 by the bolt 180 that also secures a monoball bearing 254 which is coupled to the second end 178 of the locking linkage 174. A sensor element 256, which is a portion of the electronic sensor 226 depicted in FIGS. 5 and 6, can be secured to the delay cam follower 172 to monitor the position of the delay cam follower 172 with respect to the delay cam 152. The remainder of the electronic sensor 226 is not depicted in FIG. 10 for the sake of clarity. The adjustment element 238 allows for the adjustment of the locking linkage idler 250 so as to alter the relative distance between the delay cam followers 172 and the locking linkage bell crank 236.

During the following discussion of FIG. 10, it may be helpful to occasionally refer to FIGS. 3–9. While the elements are disposed in the relative positions as depicted in FIG. 10, the blade 112 is disposed in a deployed position, the blade locking pin 222 is in contact with the fitting 212 of the blade tang 132, and the pitch angle locking pin 160 is not inserted into the opening 164 in the drive hub 118. As the position of the locking linkage 174 is altered, the locking linkage idler 250 pivots about the longitudinal axis 258 of the bolt 252 with respect to the locking linkage bell crank 236 such that the delay cam follower 172 follows the delay cam 152. The longitudinal axis 258 of the bolt 252 is generally parallel to the longitudinal axis 240 of the shaft 150.

Initially, the delay cam follower 172 follows the arcuate portion 248 of the delay cam 152 so that the shaft 150 is not rotated about the axis 240. This occurs because the arcuate portion 248 is included in a circle centered about the longitudinal axis 258 of the bolt 252. Thus, the arcuate portion 248 of the delay cam 152 allows for some movement of the locking linkage 174, such as might result from the centrifugal force of the rotation of the blade 112 about the longitudinal axis 116, without causing the shaft 150 to rotate about its longitudinal axis 240. Thus, the arcuate portion 248 of the delay cam 152 provides a "delay".

Subsequently, further movement of the locking linkage 174 causes the delay cam follower 172 to follow the remainder of the delay cam 152 such that the locking linkage bell crank 236 begins to rotate the shaft 150 about its longitudinal axis 240. As the shaft 150 rotates about its longitudinal axis 240, the blade locking bell crank 218 serves to retract the blade locking pin 222 from being in contact the blade tang 132 such that the blade 112 is no longer locked in the deployed position. Moreover, as the shaft 150 rotates about its longitudinal axis 240, the pitch angle locking bell crank 156 simultaneously serves to insert the pitch angle locking pin 160 into the opening 164 in the drive hub 118. As a result, the pitch angle of the blade 112 is fixed and the blade 112 can be pivoted from a deployed position to a folded position. Thus, the above described movement of the locking linkage 174 serves to "un-lock" the blade 112 and to "lock" the pitch angle of the blade 112.

OPERATION OF THE PREFERRED EMBODIMENT

As previously mentioned, the rotor blade stowing system of the present invention is utilized to permit the aircraft 100 to be stored so as to conserve storage space by folding a rotor blade 112. The following discussion of FIGS. 11–20 depicts the folding of the blade 112 from a deployed to a stowed position. Thus, in FIG. 11A, as in FIGS. 2–10, the rotor blade 112 is depicted in a deployed position.

FIGS. 11–20 depict a portion of the blade 112, the outer housing 134 of the blade pivot pin 130, the latch support housing 138, the shaft 150, and the bracket 162. The shaft support housing 146 and the blade grip member 120 are not shown for the sake of clarity. Moreover, only one delay cam 152 is depicted about the shaft 150 for the sake of clarity. FIGS. 11–15 depict the unlocking of the rotor blade 112 and the locking of the pitch angle of the blade 112 using the rotor blade stowing system 128 of the present invention. FIGS. 11–15 depict this process in about 10° increments as measured by the counterclockwise rotation of the locking cam 182 about the longitudinal axis 136 of the blade pivot pin 130. Thus, FIG. 16 depicts the rotor blade stowing system 128 wherein the blade 112 is ready to be pivoted from a deployed to a folded position. FIGS. 17–20 depict the pivoting of the blade 112 from a deployed to a folded position in about 15° increments as measured by the clockwise rotation of the pivoting cam 190 about the axis 136 of the blade pivot pin 130.

Figure 11A:
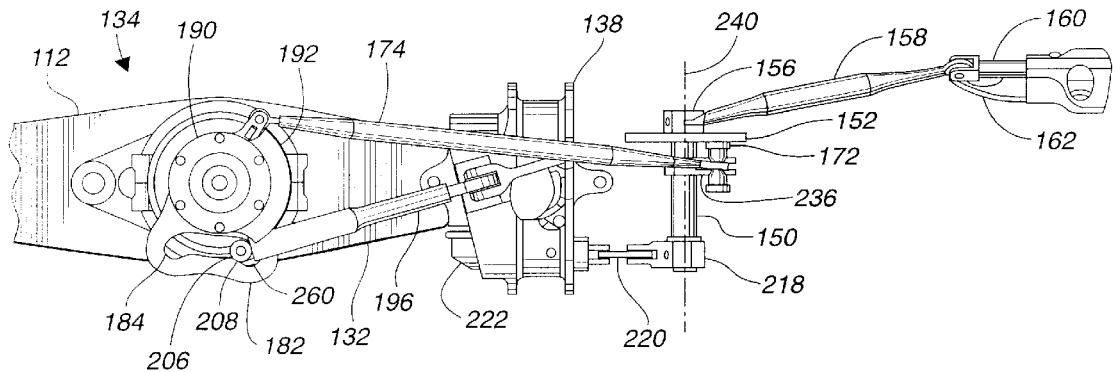
FIGS. 11A, 11B, 12A, 12B, 13A, 13B, 14A, 14B, 15A, 15B, 16A, 16B, 17A, 17B, 18A, 18B, 19A, 19B, 20A and 20B depict incremental dispositions of a power operated rotor blade stowing system in accordance with the present invention as a blade of an aircraft is pivoted from a deployed to a folded position.
Figure 11B:
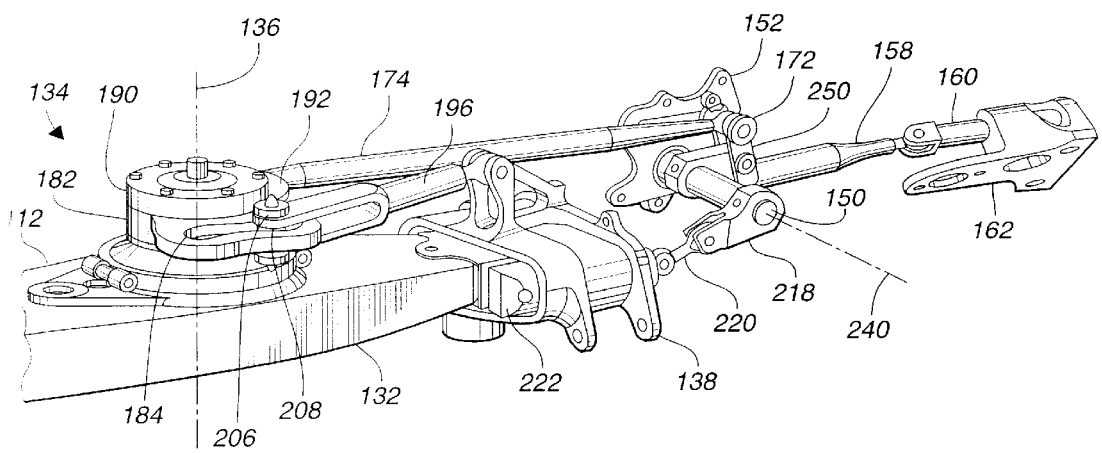

Initially, as shown in FIG. 11, the blade 112 is disposed in a deployed position such that the blade tang 132 is disposed within the latch support housing 138. The blade 112 is secured within the latch support housing 138 by the blade locking pin 222. Moreover, the pitch angle locking pin 160 is disposed in the bracket 162 such that it does not serve to prevent variation in the pitch angle of the blade 112. Optionally, the locking cam 182 can include a second detent 260 to allow for some movement of the locking cam follower 208 with respect to the locking cam 182 such as may result during flight.

Figure 12A:
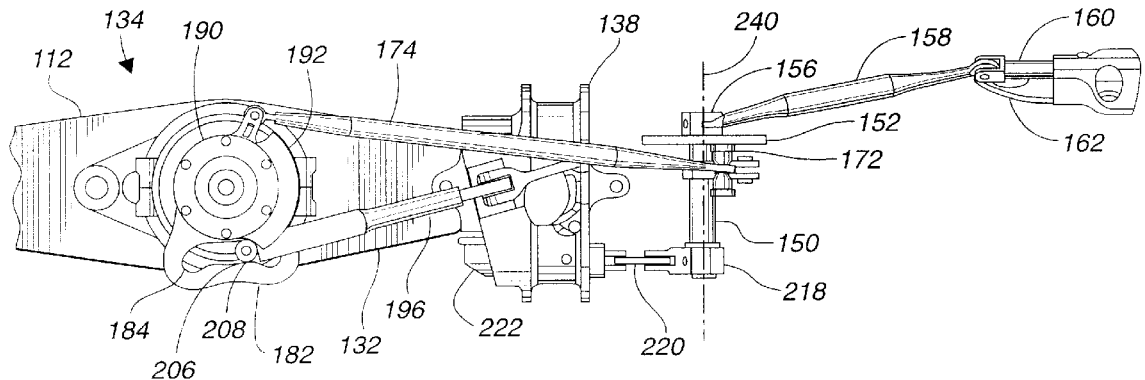
Figure 12B:
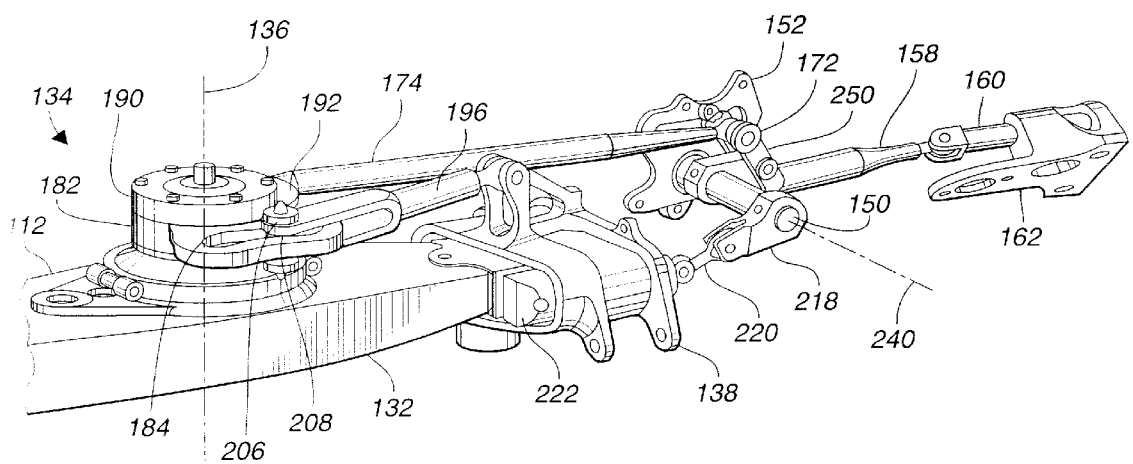

In FIG. 12, the rotary actuator 194 is actuated causing the drive motor to rotate the planetary gears which are operably coupled to the pivoting cam 190 and the locking cam 182. When this occurs, the pivoting cam 190 is held in a stationary position with respect to the outer housing 134 by the pivoting cam follower 206 that is attached to the cam follower linkage 196. The pivoting cam 190 is held in a stationary position because the pivoting cam follower 206 abuts the shoulder portion 192 of the pivoting cam 190. As a result, the locking cam 182 begins to rotate about the axis 136 in a counterclockwise direction as viewed in FIG. 12B. Due to the arcuate portion 248 of the delay cam 152 shown in FIG. 9, the shaft 150 is not yet caused to rotate about the axis 240. Thus, the blade locking pin 222 remains in contact with the blade tang 132 and the pitch angle locking pin 160 remains in the bracket 162 until the delay cam follower 172 finishes following the arcuate portion 248 of the delay cam 152. The locking cam follower 208, which is also coupled to the cam follower linkage 196, follows the locking cam 182 as it continues its counterclockwise rotation about the axis 136.

Figure 13A:
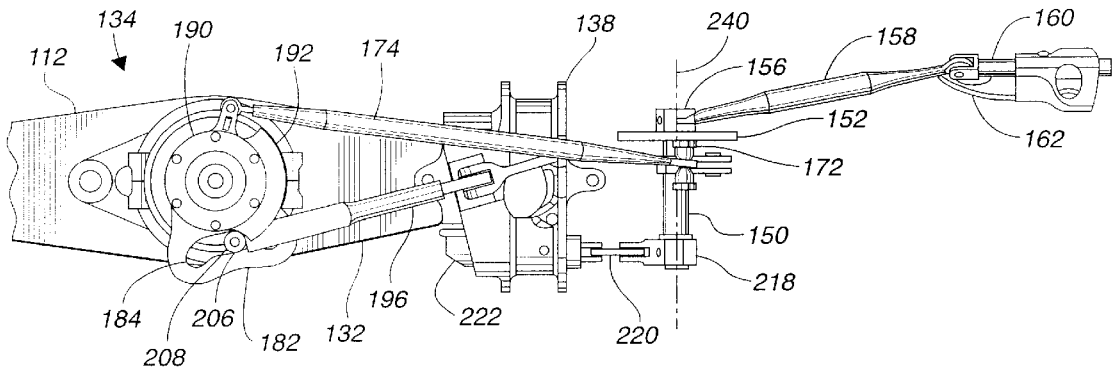
Figure 13B:
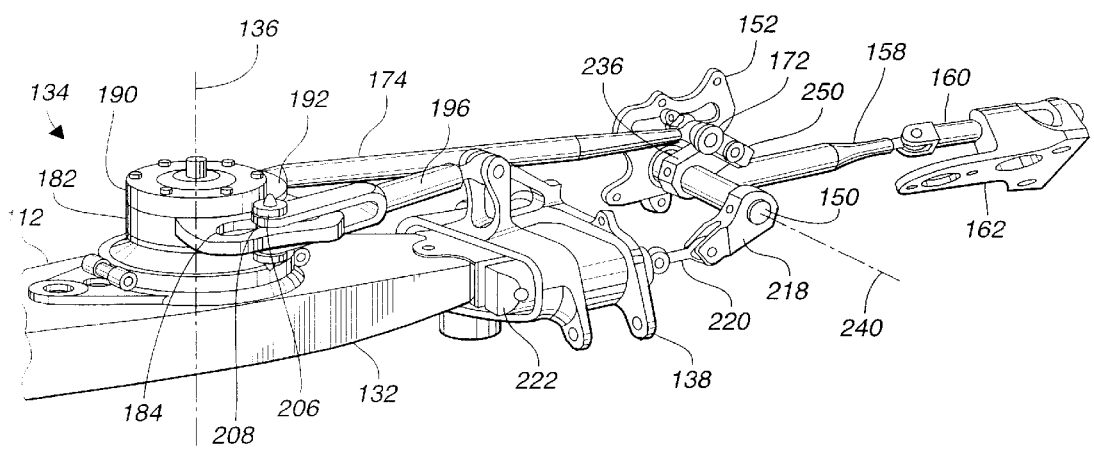

In FIGS. 13A and 13B, the delay cam follower 172 has finished following the arcuate portion 248 of the delay cam 152. As a result of the continued counterclockwise rotation of the locking cam 182 about the axis 136, the locking linkage 174 begins to cause the locking linkage bell crank 236 to rotate the shaft 150 about its longitudinal axis 240. As a result of the rotation of the shaft 150 about its longitudinal axis 240, the blade locking bell crank 218 causes the blade locking pin 222 to begin to be removed from contact with the blade tang 132. Moreover, the pitch angle locking bell crank 156 causes the pitch angle locking pin 160 to begin to be extended from the bracket 162, as shown in FIG. 13A.

Figure 14A:
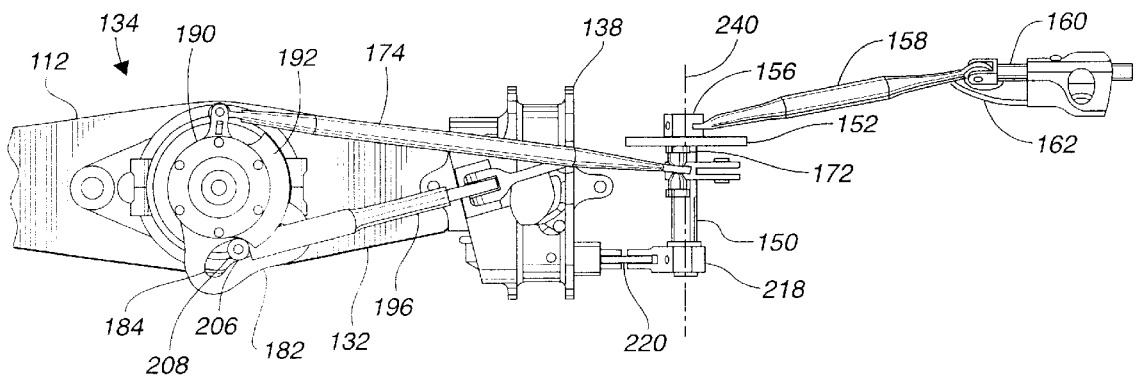
Figure 14B:
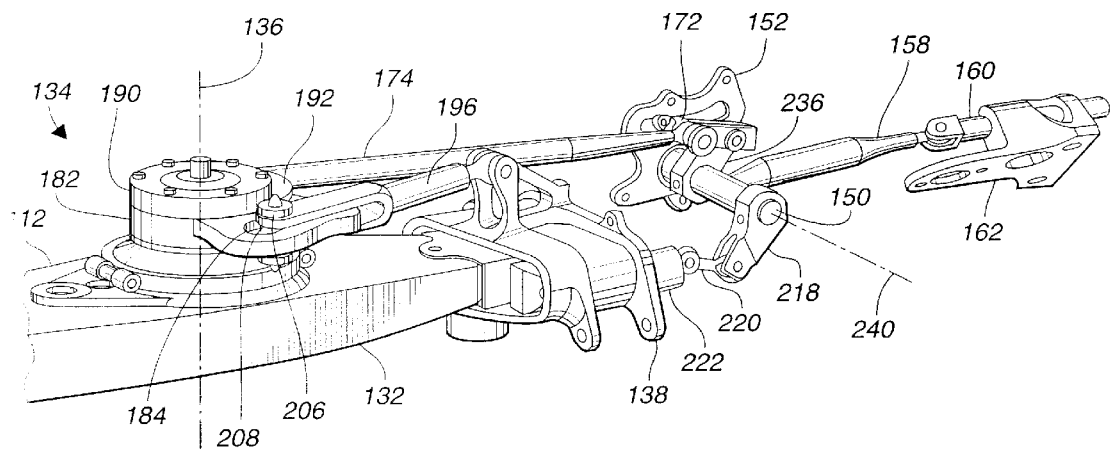

FIGS. 14A and 14B depict the effects of the continued counterclockwise rotation of the locking cam 182 about the axis 136. These effects include the continued removal of the blade locking pin 222 from engaging the blade tang 132 and the continued extension of the pitch angle locking pin 160 from the bracket 162. These effects are caused by the continued counterclockwise rotation of the shaft 150 about the axis 240 which is the result of the continued movement of the locking linkage 174 caused by the rotation of the locking cam 182 about the axis 136.

Figure 15A:
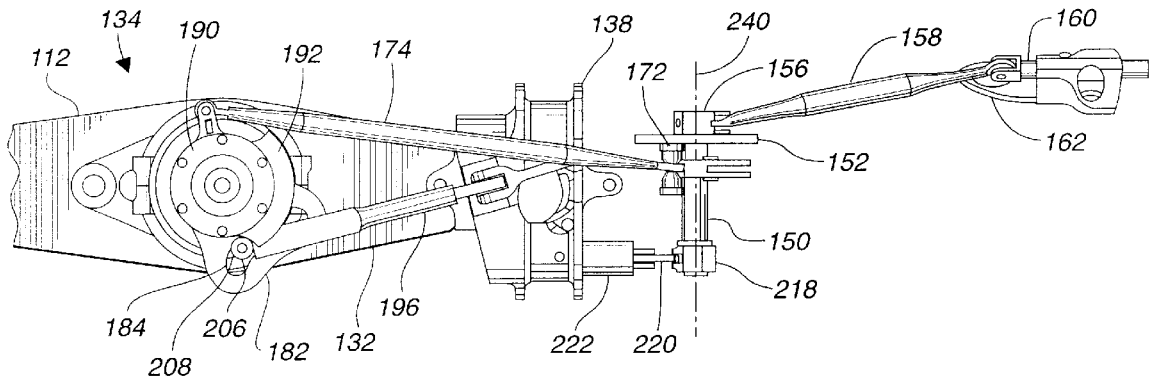
Figure 15B:
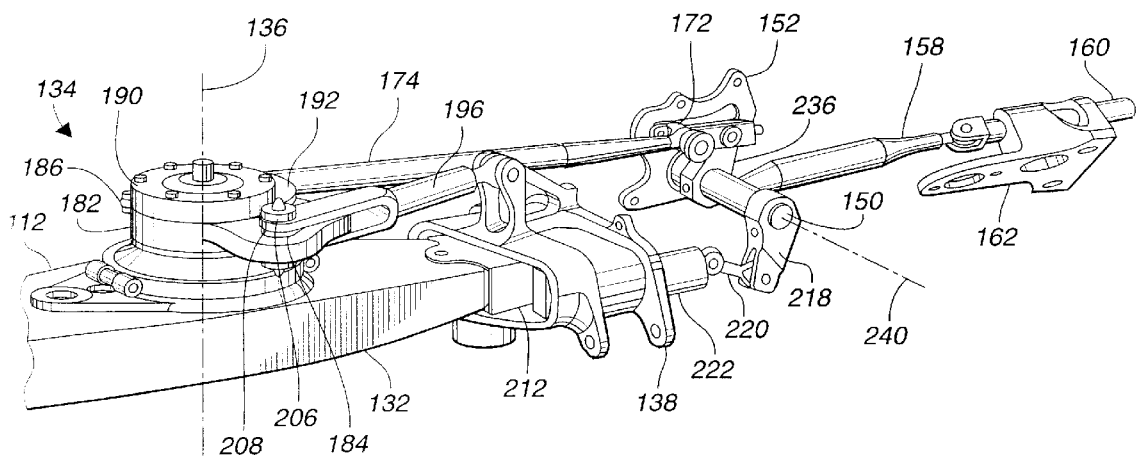

FIGS. 15A and 15B depict the effects of the continued counterclockwise rotation of the locking cam 182 about the axis 136. As shown in FIG. 15B, the blade locking pin 222 is almost completely removed from engagement with the blade tang 132 and the pitch angle locking pin 160 has begun to be inserted into the opening 164 in the drive hub 118. FIG. 15B also depicts the monoball bearing 186 which connects the locking linkage 174 to the locking cam 182.

Figure 16A:
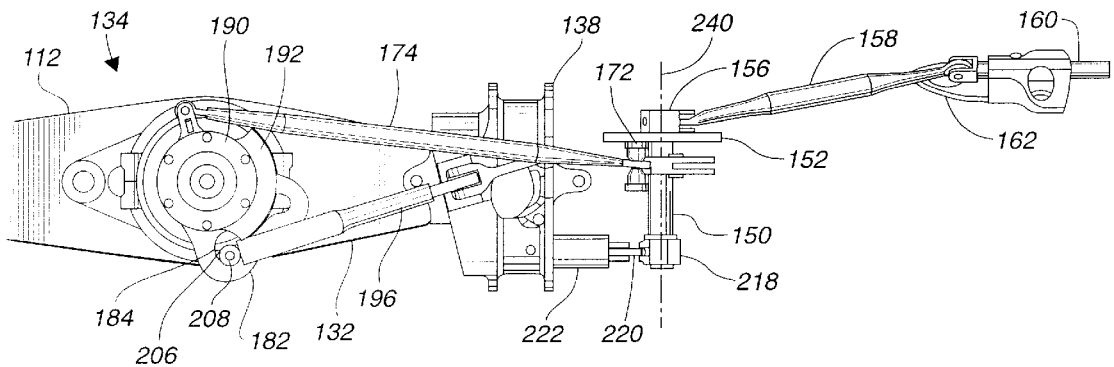
Figure 16B:
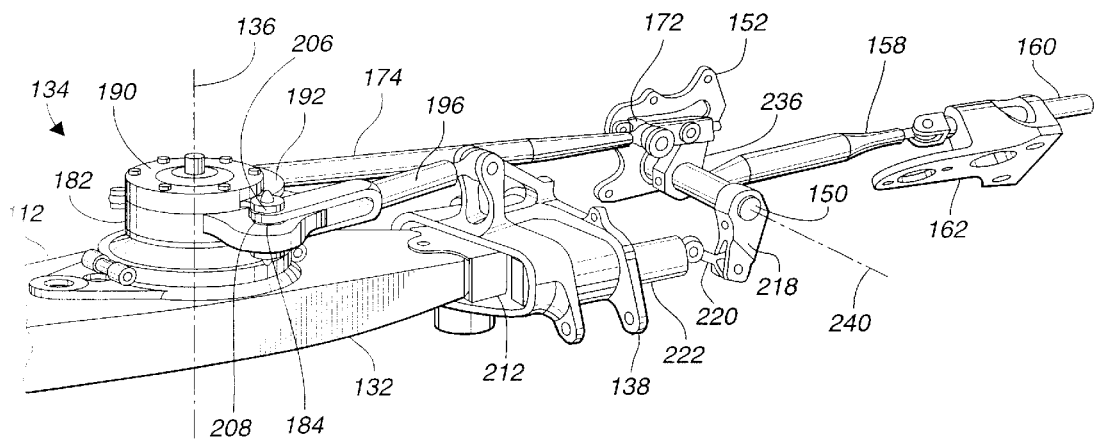

In FIGS. 16A and 16B, the locking cam 182 has finished rotating about the axis 136 and the locking cam follower 208 is disposed within the first detent 184. As shown in FIG. 16, the locking cam follower 208, which is coupled to the cam follower linkage 196, has finally come in contact with the first detent 184 so as to prevent further rotation of the locking cam 182 in the counterclockwise direction. Moreover, as a result of the first detent 184, the pivoting cam follower 206 no longer prevents the pivoting cam 190 from rotating. As a result, the pivoting cam 190 is free to rotate in the clockwise direction about the axis 136. This rotation of the pivoting cam 190 will cause the blade 112 to begin to pivot about the axis 136 from a deployed to a folded position. As shown in FIG. 16B, this can occur because the blade locking pin 222 has been completely removed from being in contact with the blade tang 132 and the pitch angle locking pin 160 has been fully inserted in the opening 164 in the drive hub 118. As a result, the blade 112 is free to be folded into a stowed position without any variation in the pitch angle of the blade 112.

Figure 17A:
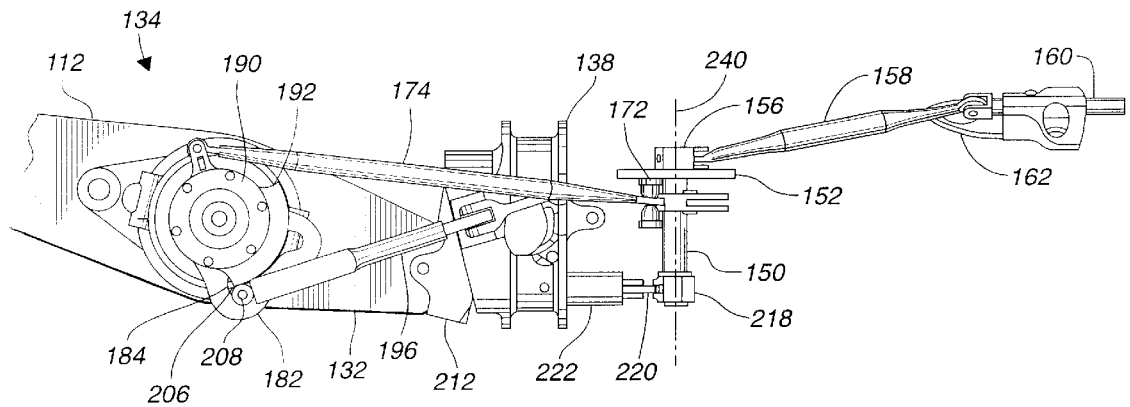
Figure 17B:
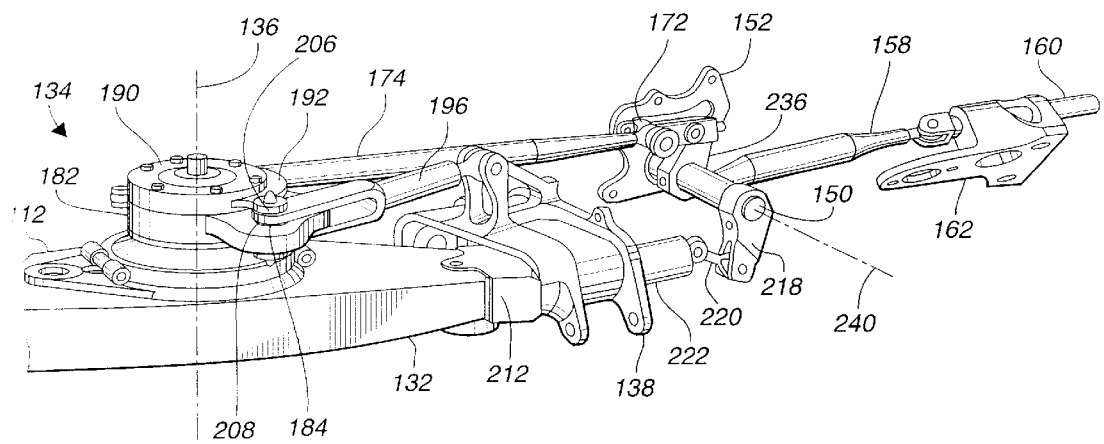

As the pivoting cam 190 begins to rotate in the clockwise direction about the axis 136, as shown in FIGS. 17A and 17B, the blade 112 begins to pivot about the axis 136 as well. Moreover, the pivoting cam follower 206 follows the shoulder portion 192 of the pivoting cam 190. As a result, the blade tang 132 which has the fitting 212 coupled thereto begins to exit from the latch support housing 138. During the remaining folding of the blade 112, the shaft 150 is not rotated about the axis 240.

Figure 18A:
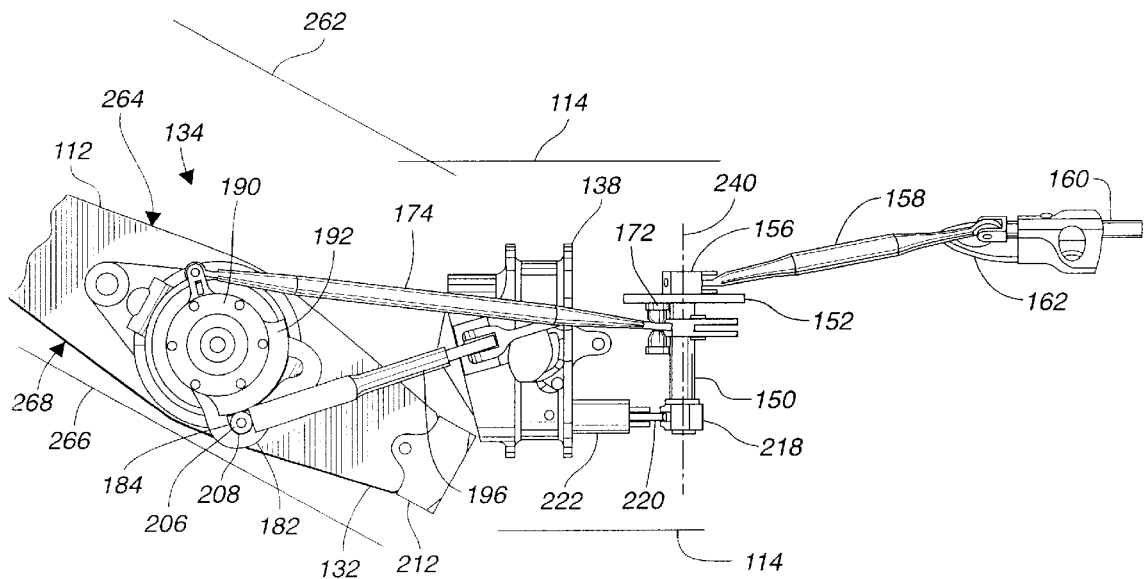
Figure 18B:
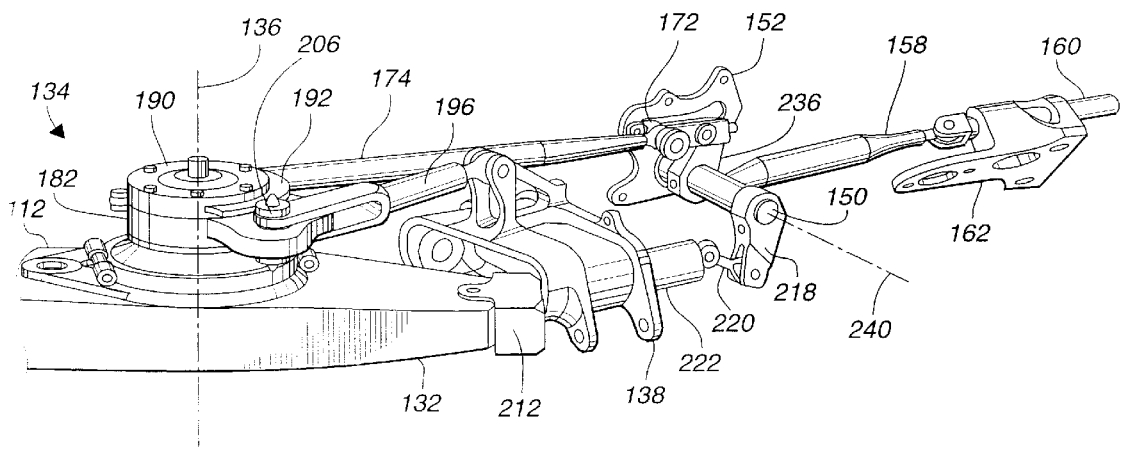

As shown in FIGS. 18A and 18B, the continued clockwise rotation of the pivoting cam 190 about the axis 136 causes the blade tang 132 to be completely removed from the latch support housing 138. As previously mentioned, the blade grip member 120 which supports the latch support housing 138 can covered by a fairing 114. As the blade 112 is folded, the position of the fairing 114 must be altered so as to prevent damage thereto. The present invention also provides a method of opening portions of the fairing 114 from the path of the folding blade 112. As shown in FIG. 18A, this is accomplished by securing a hinging portion 262 of the fairing 114 to an advancing side 264 of the blade 112. The advancing side 264 of the blade 112 advances into the direction that the blade 112 travels as the blade 112 pivots from a deployed position to a folded position. The advancing portion 262 of the fairing 114 releasably mates with the remainder of the fairing 114 in a piano hinge. An opening portion 266 of the fairing 114 is secured to a following side 268 of the blade 112. The following side 268 of the blade 112 follows the blade 112 as it pivots from a deployed to a folded position. The opening portion 266 rotates with the blade 112 as it is folded and releasably mates with the remainder of the fairing 114. Thus, the present invention provides for the opening of portions of the fairing 114 as an integral part of the process of folding the blade 112.

Figure 19A:
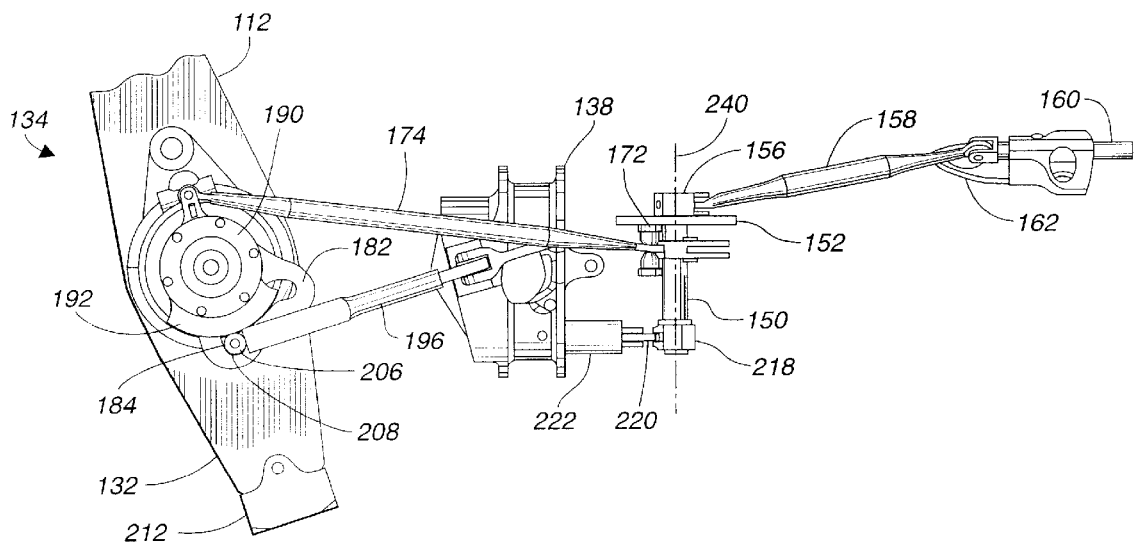
Figure 19B:
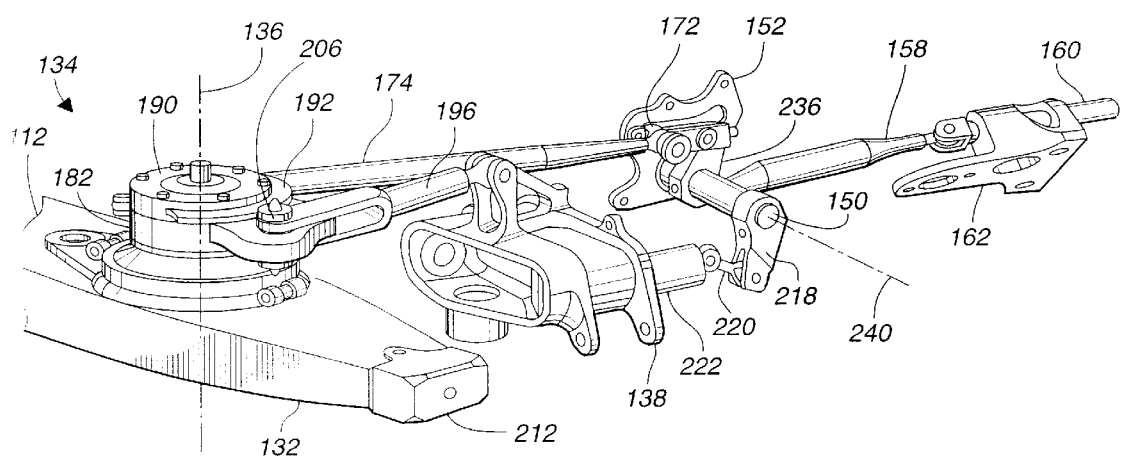
Figure 20A:
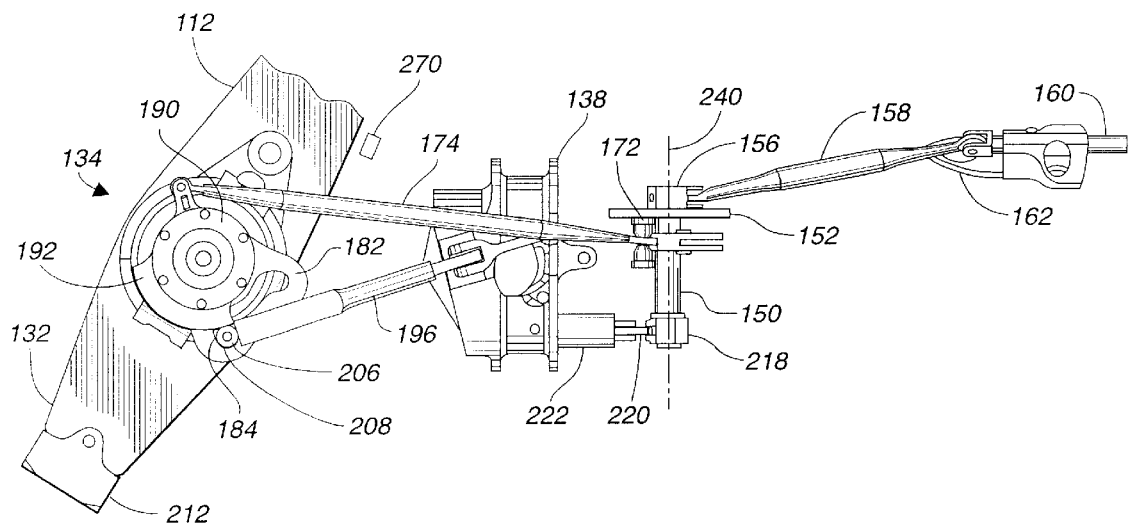
Figure 20B:
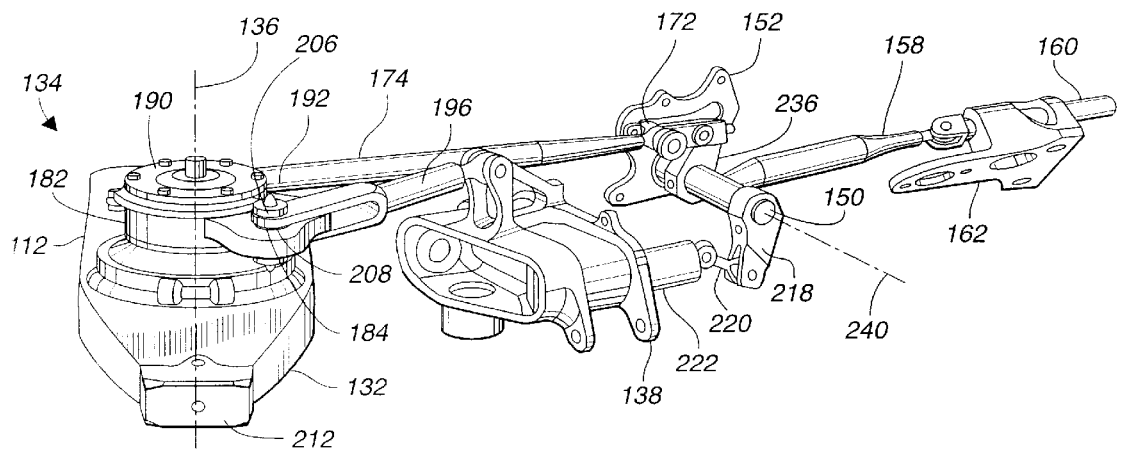

FIGS. 19A and 19B depict the continued clockwise rotation of the pivoting cam 190 about the axis 136. This results in the continued folding of the blade 112 which continues until, as shown in FIGS. 20A and 20B, the blade 112 is in a folded position. As shown in FIG. 20A, a second blade positioning member 270 can be provided so as to prevent further rotation of the blade 112 about the axis 136. Thus, the blade 112 can be pivoted from a deployed to a folded position by the rotor blade stowing system of the present invention.

In addition, the rotor blade stowing system of the present invention also allows for the blade 112 to be pivoted from a folded position to a deployed position by again actuating the rotary actuator 194 and generally reversing the above steps. For example, assuming that the blade 112 is in a folded position, the blade 112 can be deployed by actuating the rotary actuator 194 to cause the pivoting cam 190 to rotate the blade 112 from a folded to a deployed position. Once the blade 112 has reached a desired deployment, the blade 112 can be prevented from rotating further by the first blade positioning member 140. Moreover, the cam follower linkage 196 abuts the pivoting cam follower 206 against the shoulder portion 192 of the pivoting cam 190 so as to prevent any clockwise rotation of the pivoting cam 190 about the axis 136. Moreover, the movement of the cam follower linkage 196 removes the locking cam follower 208 from the first detent 184 in the locking cam 182. As a result, the locking cam 182 can then rotate in a clockwise direction about the longitudinal axis 136, as viewed in FIG. 20B, such that the locking linkage 174 causes the shaft 150 to rotate about its longitudinal axis 140. The rotation of the shaft 150 about its longitudinal axis 140 causes the pitch angle locking pin 160 to be removed from the drive hub 118 so as to allow for variation in the pitch angle of the blade 112. Moreover, the rotation of the shaft 150 can also simultaneously cause the blade locking pin 222 to abut the blade tang 132 so as to secure the blade 112 in a deployed position.

From the foregoing, it can be seen that a substantial saving in storage area for the aircraft 100 has been accomplished by utilizing a power operated rotor blade stowing system in accordance with the present invention. Moreover, a power operated rotor blade stowing system in accordance with the present invention provides for a quick and efficient folding, stowing and deploying of the blade 112.

The above detailed description of the present invention is not intended to be limitative such that the above description embraces any change or modification thereto which is within the spirit and scope of the invention.

We claim:

1. A rotor blade stowing system for stowing a rotor blade comprising:

a rotary actuator for pivoting a rotor blade between folded and deployed positions, said blade being pivotally connected to a blade grip member, said rotary actuator being disposed on said blade, said rotary actuator being operably coupled to a blade pivoting cam and a locking cam, said blade pivoting cam having a shoulder portion, said locking cam having a detent;

a cam follower linkage having a first end and a second end, said first end of said cam follower linkage having a blade pivoting cam follower and a locking cam follower, said blade pivoting cam follower on said first end of said cam follower linkage following said blade pivoting cam, said locking cam follower on said first end of said cam follower linkage following said locking cam, said second end of said cam follower linkage being coupled to said blade grip member;

a locking linkage having a first end and a second end, said first end of said locking linkage being coupled to said locking cam;

a shaft rotatably coupled to said blade grip member;

a locking linkage bell crank operably coupled to said shaft;

a locking linkage idler operably coupled to said locking linkage bell crank and said second end of said locking linkage, said locking linkage idler having a delay cam follower;

a shaft support housing; and a delay cam coupled to said shaft support housing with said shaft extending through said delay cam, said delay cam including an arcuate portion such that said delay cam follower of said locking linkage idler can follow said arcuate portion of said delay cam without causing rotation of said shaft.

2. The system of claim 1 further comprising a pitch angle locking assembly operably coupled thereto.

3. The system of claim 2 wherein said pitch angle locking assembly comprises a pitch angle locking bell crank operably coupled to said shaft, said pitch angle locking bell crank being operably coupled to a pitch angle locking pin through a pitch angle locking pin linkage.

4. The system of claim 3, wherein said pitch angle locking pin is slidably supported by a bracket coupled to said blade grip member.

5. The system of claim 3 wherein said pitch angle locking pin is received into an opening in a drive hub of a rotor assembly so as to prevent any variation in the pitch angle of said blade.

6. The system of claim 1 further comprising a blade locking assembly operably coupled thereto.

7. The system of claim 6 wherein said blade locking assembly comprises a blade locking bell crank operably coupled to said shaft, said blade locking bell crank being operably coupled to a blade locking pin through a blade locking assembly idler.

8. The system of claim 7 further comprising an over center mechanism that prevents said blade locking pin from inadvertently disengaging said blade.

9. The system of claim 7 wherein said blade locking pin releasably engages said blade such that a longitudinal axis of said blade locking pin is disposed in an angular relation with respect to a longitudinal axis of said blade grip member when said blade locking pin engages said blade.

10. The system of claim 1 wherein said shaft support housing is made of aluminum.

11. The system of claim 1 wherein said second end of said cam follower linkage is coupled to said blade grip member by a latch support housing that is coupled to said blade grip member.

12. The system of claim 11 wherein said latch support housing is made of titanium.

13. The system of claim 11 wherein said latch support housing comprises a first blade positioning member having a surface engageable with said blade when said blade is in a deployed position for positioning said blade at a desired deployment.

14. The system of claim 13 wherein said latch support housing further comprises a first blade contact member disposed between said first blade positioning member and said blade when said blade is in a deployed position such that said first blade contact member contacts said blade.

15. The system of claim 1 wherein said system further comprises an additional delay cam, said additional delay cam having an arcuate portion and being coupled to said blade grip member such that an additional delay cam follower on said locking linkage idler can follow said arcuate portion of said additional delay cam without causing rotation of said shaft.

16. The system of claim 1 wherein said locking linkage idler is operably coupled to said locking linkage bell crank by a bolt, said locking linkage idler rotating about the longitudinal axis of said bolt, said arcuate portion of said delay cam being contained in a circle centered on said longitudinal axis of said bolt.

17. The system of claim 16 wherein said longitudinal axis of said bolt is generally parallel to the longitudinal axis of said shaft.

18. The system of claim 1 further comprising an electronic sensor coupled to said delay cam follower of said locking linkage idler.

19. The system of claim 1 further comprising an additional blade pivoting cam, said additional blade pivoting cam having a shoulder portion and being operably coupled to said rotary actuator, said cam follower linkage that follows said additional blade pivoting cam, said locking cam being disposed between said blade pivoting cam and said additional blade pivoting cam.

20. The system of claim 1 further comprising an additional locking cam, said additional locking cam having a detent and being operably coupled to said rotary actuator, said cam follower linkage further comprising an additional locking cam follower on said first end of said cam follower linkage that follows said additional locking cam, said blade pivoting cam being disposed between said locking cam and said additional locking cam.

21. The system of claim 1 further comprising an adjustment element coupled to said locking linkage idler to adjust the relative position of said delay cam follower of said locking linkage idler with respect to said locking linkage bell crank.

22. The system of claim 1 wherein said rotary actuator comprises a drive motor operably coupled to a system of planetary gears, said system of planetary gears being operably coupled to said blade pivoting cam and said locking cam.

23. The system of claim 1 wherein said rotary actuator is disposed within a blade pivot pin which allows said blade to pivot about a longitudinal axis of said blade pivot pin, said rotary actuator being operably coupled to said blade pivoting cam and said locking cam so as to pivot said blade between deployed and folded positions.

24. The system of claim 1 wherein said blade has an advancing side and a following side, said advancing side of said blade advancing in the direction said blade pivots when said blade is being folded from a deployed position to a folded position, said following side of said blade following said advancing side of said blade when said blade is being folded from a deployed position to a folded position.

25. The system of claim 24 wherein said advancing side of said blade has coupled thereto a hinging portion of a fairing that covers said blade grip member, said hinging portion of said fairing being piano hinged with said fairing so as to allow for the opening of said hinging portion of said fairing to allow said blade to fold.

26. The system of claim 25 wherein said following side of said blade has coupled thereto an opening portion of a fairing that covers said blade grip member, said opening portion of said fairing being releasably mated with said fairing so as to allow for the opening of said opening portion of said fairing to allow said blade to fold.

27. The system of claim 1 wherein said locking cam is a dwell cam and said delay cam is a dwell cam.

28. A blade stowing mechanism for moving a rotor blade between folded and deployed positions, the mechanism comprising:

a blade tang receptacle carried by a blade grip, the blade tang receptacle for receiving a tang portion of the rotor blade;

a blade lock assembly for rigidly locking the tang portion in the blade tang receptacle;

a rotary actuator coupled between the tang portion of the rotor blade and the blade grip, the rotary actuator for pivoting the blade relative to the blade grip;

a locking cam carried by the rotary actuator and rotatable relative to the rotor blade;

a pitch lock assembly for selectively locking the rotor blade against a change in pitch angle;

a locking link bell crank pivotally carried on a shaft by the blade grip and operably coupled to the blade and pitch lock assemblies, the locking link bell crank including a delay cam follower following a delay cam;

a shaft support housing;

said delay cam being coupled to said shaft support housing with said shaft extending through said delay cam:

a blade pivoting link extending between and coupled to the locking cam and the blade grip, wherein rotation of the locking cam by the actuator causes selective rotation of the rotor blade relative to the blade grip; and a locking link extending between and coupled to the locking cam and the delay cam, wherein rotation of the locking cam by the actuator selectively causes movement of the locking link, locking link bell crank, and actuation of the pitch lock and blade lock assemblies;

wherein rotation of the actuator in a first direction moves the locking link and locking link bell crank to lock the pitch lock assembly and unlock the blade lock assembly, further rotation of the actuator in the first direction causing the blade to disengage from the blade tang receptacle and pivot relative to the blade grip to the folded position.

29. The blade stowing mechanism according to claim 28 wherein the rotary actuator is a part of a pivot pin about which the rotor blade pivots between the folded and deployed positions.

30. The blade stowing mechanism according to claim 28 wherein the locking cam includes a detent and dwell portion to permit rotation of the actuator without movement of the blade pivoting link.

31. The blade stowing mechanism according to claim 30 further comprising a shoulder carried by the rotary actuator that selectively confines the blade pivoting link in the detent portion of the locking cam to pivot the rotor blade relative to the blade grip.

32. The blade stowing mechanism according to claim 28 wherein the delay cam is a dwell cam.

33. A blade stowing mechanism for moving a rotor blade between folded and deployed positions, the mechanism comprising:

a rotary actuator coupled between a tang portion of the rotor blade and a blade grip, the rotary actuator for pivoting the blade relative to the blade grip;

a blade lock assembly for locking the tang portion to the blade grip;

a locking cam carried by the rotary actuator and rotatable relative to the rotor blade;

a locking link bell crank pivotally carried on a shaft by the blade grip and operably coupled to the blade lock assembly, the locking link bell crank including a delay cam follower following a delay cam;

a shaft support housing;

said delay cam being coupled to said shaft support housing with said shaft extending through said delay cam;

a blade pivoting link extending between and coupled to the locking cam and the blade grip, wherein rotation of the locking cam by the actuator causes selective rotation of the rotor blade relative to the blade grip; and a locking link extending between and coupled to the locking cam and the delay cam, wherein rotation of the locking cam by the actuator selectively causes movement of the locking link, locking link bell crank, and actuation of the blade lock assembly;

wherein rotation of the actuator in a first direction moves the locking link and locking link bell crank to lock the pitch lock assembly and unlock the blade lock assembly, further rotation of the actuator in the first direction causing the blade to disengage from and pivot relative to the blade grip to the folded position.

34. The blade stowing mechanism according to claim 33 wherein the rotary actuator is a part of a pivot pin about which the rotor blade pivots between the folded and deployed positions.

35. The blade stowing mechanism according to claim 33 wherein the locking cam includes a detent and dwell portion to permit rotation of the actuator without movement of the blade pivoting link.

36. The blade stowing mechanism according to claim 35 further comprising a shoulder carried by the rotary actuator that selectively confines the blade pivoting link in the detent portion of the locking cam to pivot the rotor blade relative to the blade grip.

37. The blade stowing mechanism according to claim 33 further comprising:

a pitch lock assembly for selectively locking the rotor blade against a change in pitch angle, the pitch lock assembly being coupled to the locking link bell crank for actuation prior to pivoting the rotor blade relative to the blade grip.

38. The blade stowing mechanism according to claim 33 further comprising:

a blade tang receptacle carried by the blade grip, the blade tang receptacle for receiving the tang portion of the rotor blade, the blade pivoting link being coupled to the blade tang receptacle.

39. The blade stowing mechanism according to claim 33 wherein the delay cam is a dwell cam.

* * * * *